(12) United States Patent
Bauerle et al.

(10) Patent No.: US 10,703,074 B2
(45) Date of Patent: Jul. 7, 2020

(54) LUMINOUS SIGNALING GLAZING, VEHICLE INCORPORATING SAME AND MANUFACTURE

(71) Applicant: SAINT-GOBAIN GLASS FRANCE, Courbevoie (FR)

(72) Inventors: Pascal Bauerle, Roye (FR); Stephan Gillessen, Alsdorf (DE); Jean-Jacques Bris, Bey (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/304,442

(22) PCT Filed: May 17, 2017

(86) PCT No.: PCT/FR2017/051193
§ 371 (c)(1),
(2) Date: Nov. 26, 2018

(87) PCT Pub. No.: WO2017/203132
PCT Pub. Date: Nov. 30, 2017

(65) Prior Publication Data
US 2019/0134954 A1    May 9, 2019

(30) Foreign Application Priority Data
May 26, 2016 (FR) ...................... 16 54732

(51) Int. Cl.
*B32B 17/06*     (2006.01)
*B60Q 3/14*      (2017.01)
(Continued)

(52) U.S. Cl.
CPC .. *B32B 17/10541* (2013.01); *B32B 17/10036* (2013.01); *B32B 17/10385* (2013.01);
(Continued)

(58) Field of Classification Search
CPC ........ B32B 17/10293; B32B 17/10541; B32B 17/10761
(Continued)

(56) References Cited

U.S. PATENT DOCUMENTS 9,925,915 B2 *   3/2018   Bauerle ............. B32B 17/10036
2005/0238857 A1   10/2005  Day
(Continued)

FOREIGN PATENT DOCUMENTS

DE   10 2013 003686 A1   9/2014
WO   WO 2013/093351 A1   6/2013
WO   WO 2014/020249 A1   2/2014

OTHER PUBLICATIONS

International Search Report as issued in International Patent Application No. PCT/FR2017/051193, dated Sep. 4, 2017.

*Primary Examiner* — Evan P Dzierzynski
*Assistant Examiner* — Keith G. Delahoussaye
(74) *Attorney, Agent, or Firm* — Pillsbury Winthrop Shaw Pittman LLP

(57) ABSTRACT

An automotive luminous signaling glazing for example forming a laminated vehicle front windshield, includes a first exterior glazing, with a first main face and a second main face; a lamination interlayer made of polymeric material and a set of electrically conductive wires anchored on an anchoring face of the lamination interlayer, which is either the fifth main face or the sixth main main of the lamination interlayer; an interior second glazing, with a third main face and a fourth main face, the second main face and the third main face being the internal faces of the laminated glazing; and a set of diodes emitting in the direction of the interior glass. For each of the diodes, the lamination interlayer comprises a blind aperture on the opposite face to the anchoring face.

21 Claims, 9 Drawing Sheets

(51) Int. Cl.
  *B60Q 3/20*    (2017.01)
  *B32B 17/10*   (2006.01)
  *B60Q 9/00*    (2006.01)
  *G09F 13/22*   (2006.01)
  *B60K 35/00*   (2006.01)
  *B60Q 3/51*    (2017.01)
  *B60Q 3/208*   (2017.01)
  *B60K 37/06*   (2006.01)
  *B60Q 1/44*    (2006.01)
  *F21V 19/00*   (2006.01)
  *F21V 23/00*   (2015.01)
  *F21Y 115/10*  (2016.01)
  *F21W 106/00*  (2018.01)
  *B60J 1/02*    (2006.01)
  *B60J 1/08*    (2006.01)
  *B60J 1/18*    (2006.01)
  *B60Q 1/46*    (2006.01)

(52) U.S. Cl.
  CPC .. *B32B 17/10568* (2013.01); *B32B 17/10761* (2013.01); *B60K 35/00* (2013.01); *B60K 37/06* (2013.01); *B60Q 1/44* (2013.01); *B60Q 3/14* (2017.02); *B60Q 3/208* (2017.02); *B60Q 3/51* (2017.02); *B60Q 9/008* (2013.01); *F21V 19/002* (2013.01); *F21V 23/001* (2013.01); *G09F 13/22* (2013.01); *B32B 2457/206* (2013.01); *B32B 2605/006* (2013.01); *B60J 1/02* (2013.01); *B60J 1/08* (2013.01); *B60J 1/18* (2013.01); *B60K 2370/1529* (2019.05); *B60K 2370/33* (2019.05); *B60K 2370/332* (2019.05); *B60K 2370/338* (2019.05); *B60K 2370/785* (2019.05); *B60Q 1/46* (2013.01); *F21W 2106/00* (2018.01); *F21Y 2115/10* (2016.08)

(58) Field of Classification Search
  USPC .......................................................... 362/503
  See application file for complete search history.

(56) References Cited

U.S. PATENT DOCUMENTS

| | | | |
|---|---|---|---|
| 2006/0275599 A1* | 12/2006 | Lefevre | B32B 17/10018 428/332 |
| 2009/0046355 A1* | 2/2009 | Derda | B32B 17/10 359/359 |
| 2009/0114928 A1 | 5/2009 | Messere et al. | |
| 2009/0219468 A1* | 9/2009 | Barton | B32B 17/10 349/104 |
| 2015/0151675 A1* | 6/2015 | Lefevre | B32B 17/10 362/520 |
| 2016/0325529 A1* | 11/2016 | Linthout | B32B 17/10036 |
| 2018/0192477 A1* | 7/2018 | Klein | H03K 17/962 |
| 2018/0207909 A1* | 7/2018 | Vivier | G06F 3/044 |
| 2019/0111664 A1* | 4/2019 | Neander | B32B 27/40 |
| 2019/0134952 A1* | 5/2019 | Varanasi | B32B 17/10036 |
| 2019/0160789 A1* | 5/2019 | Mattos, Jr. | B32B 15/20 |

\* cited by examiner

Fig.1bis

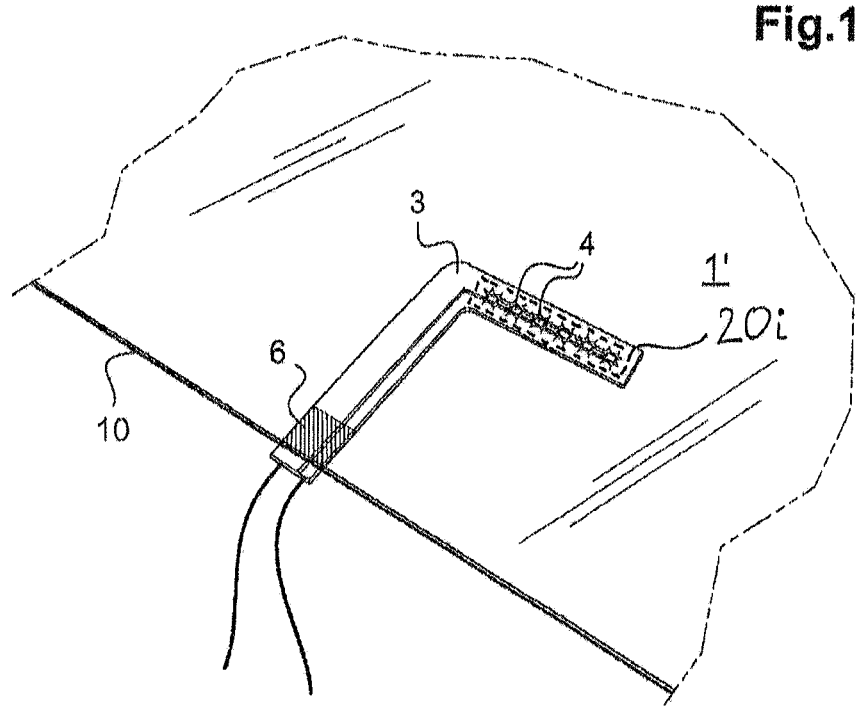
Fig.1'bis

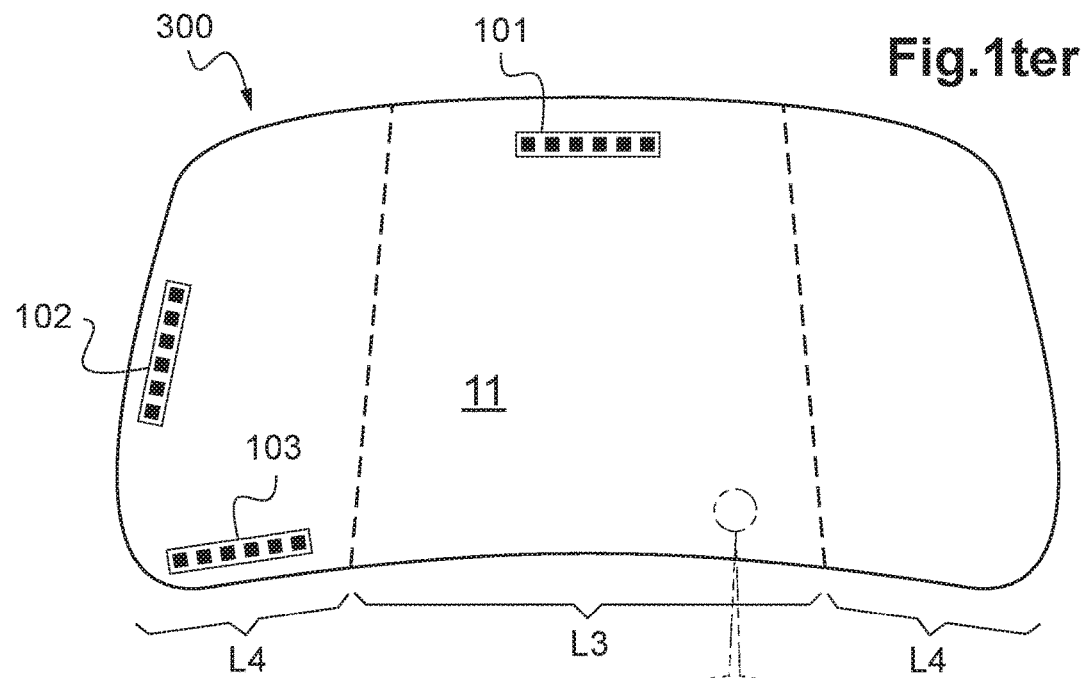
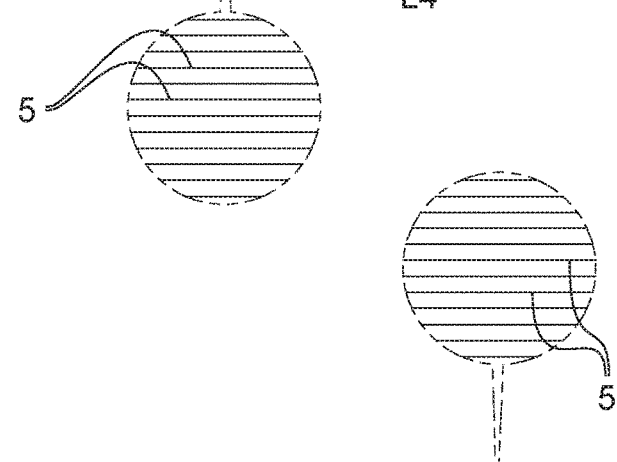
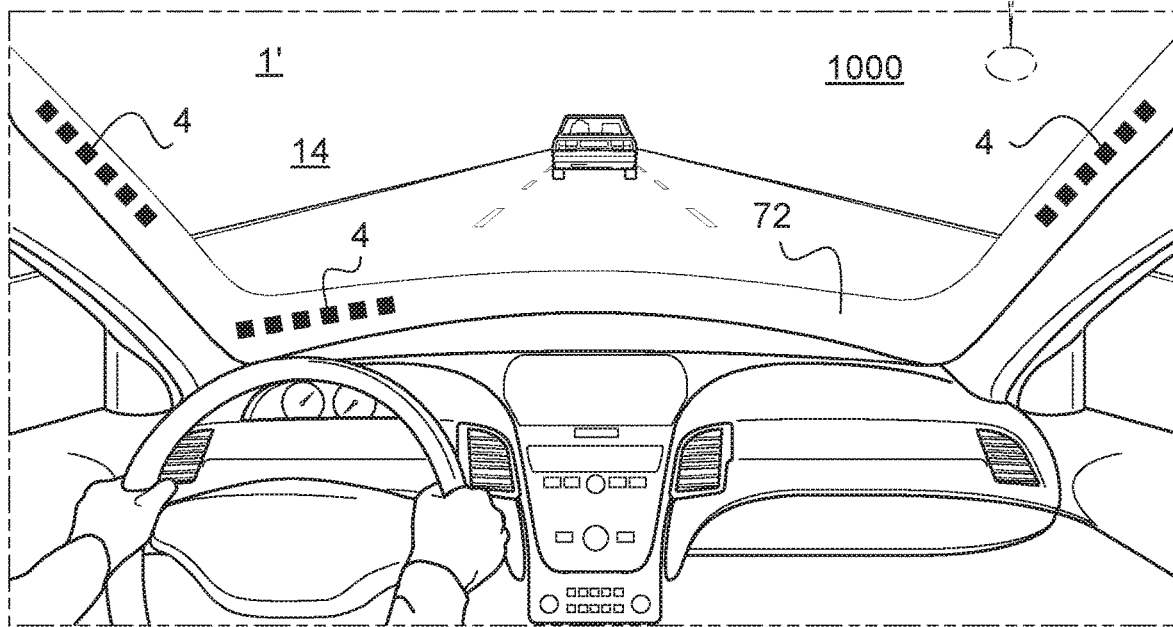

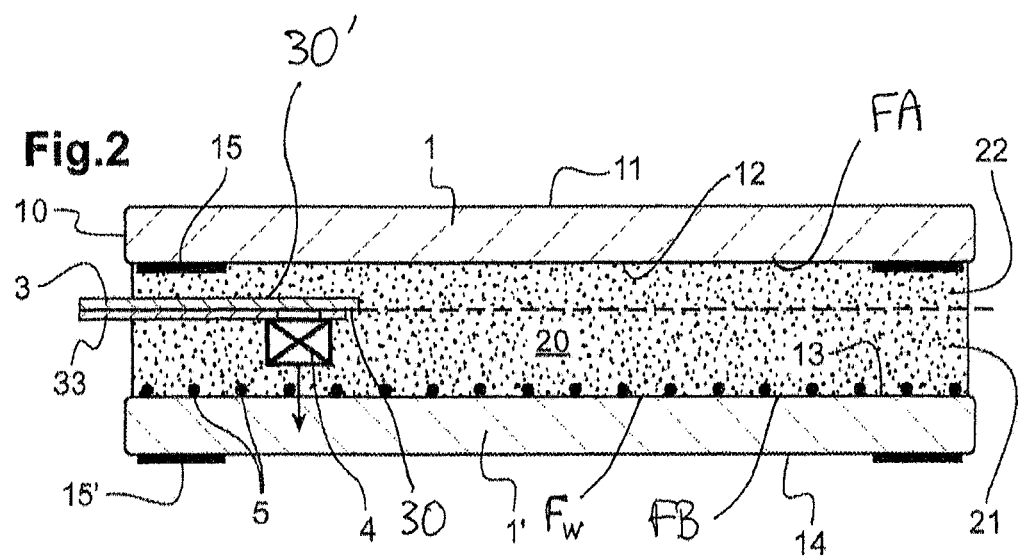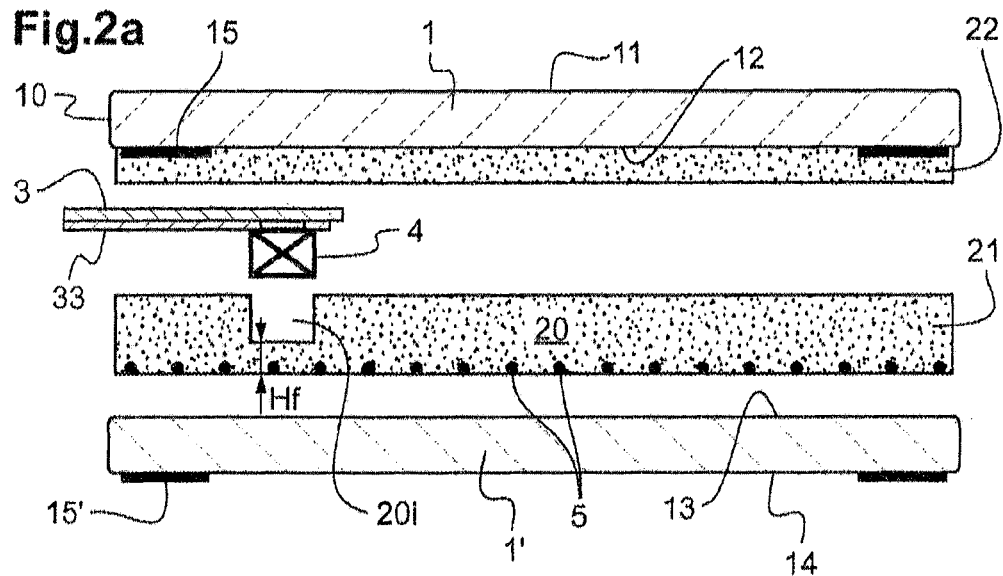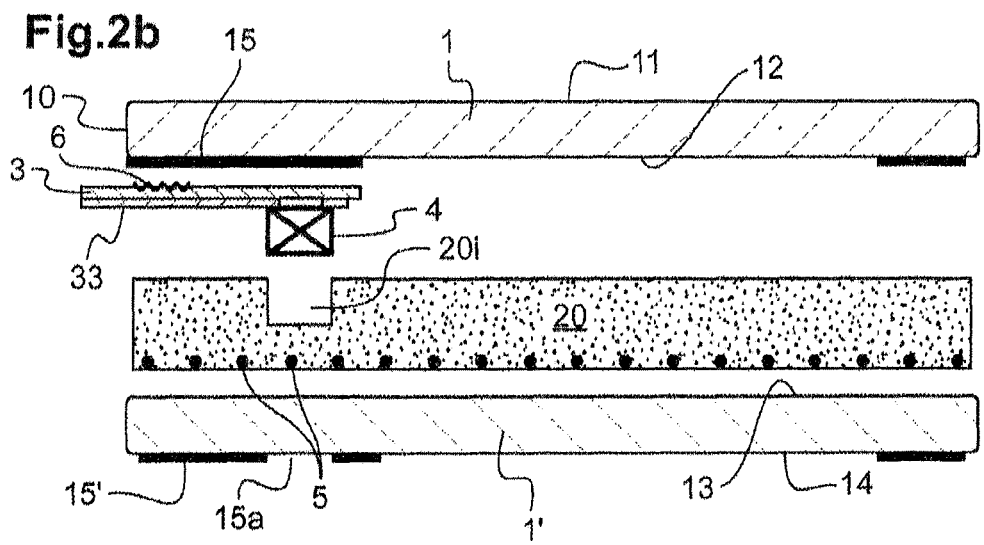

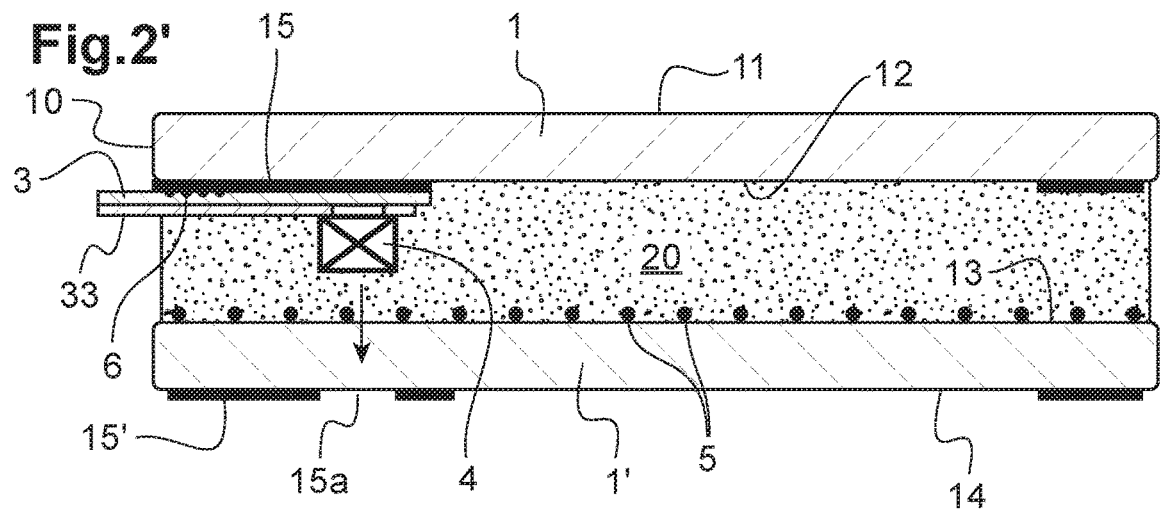
Fig.2'
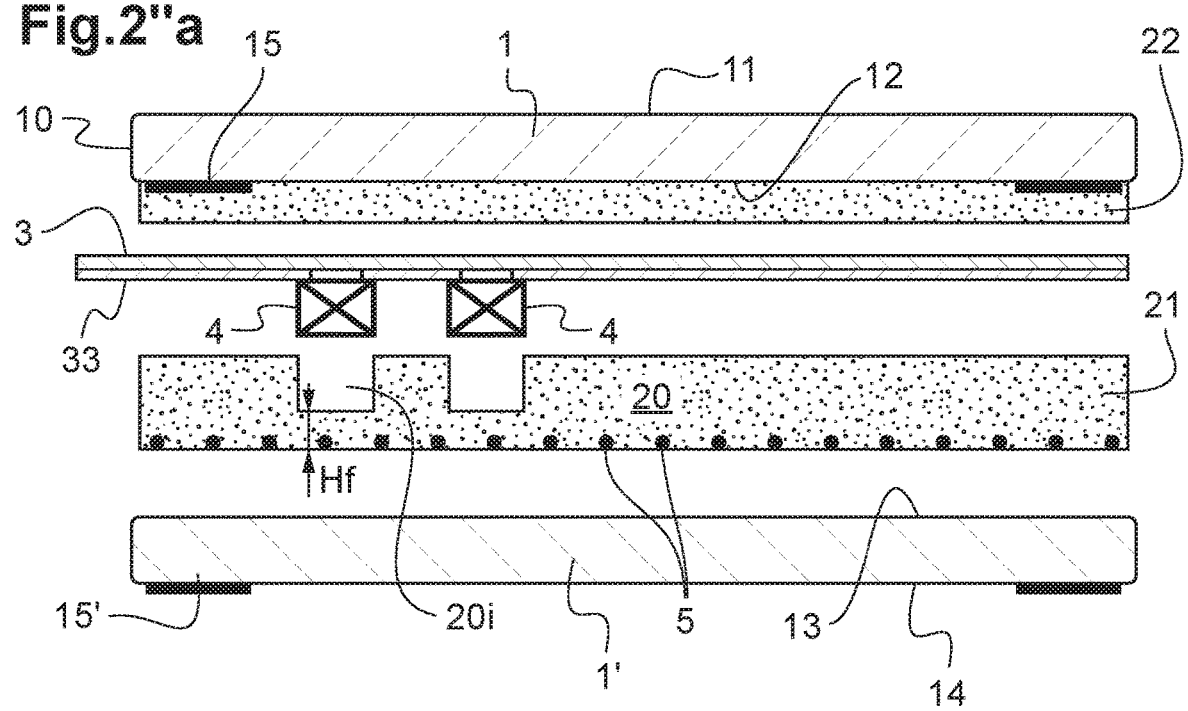
Fig.2"a

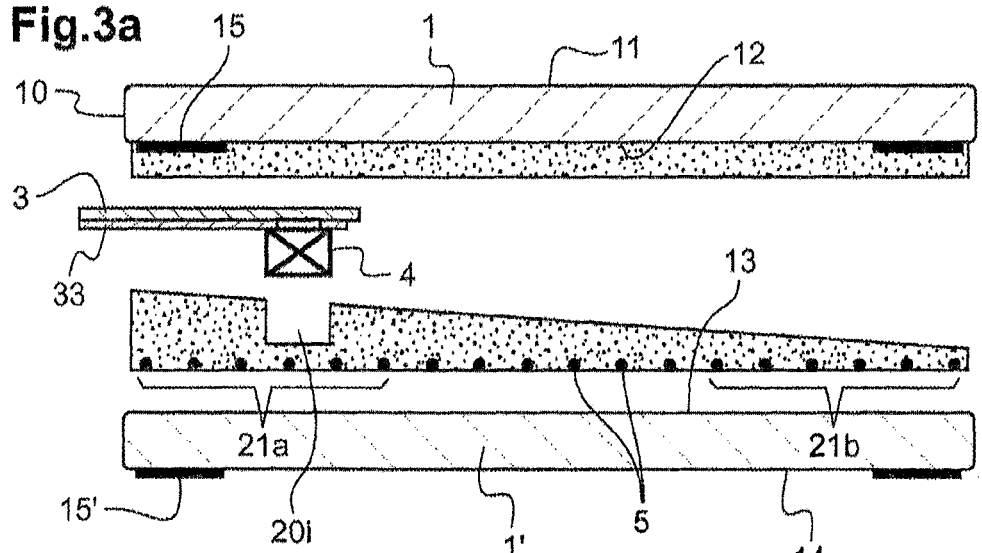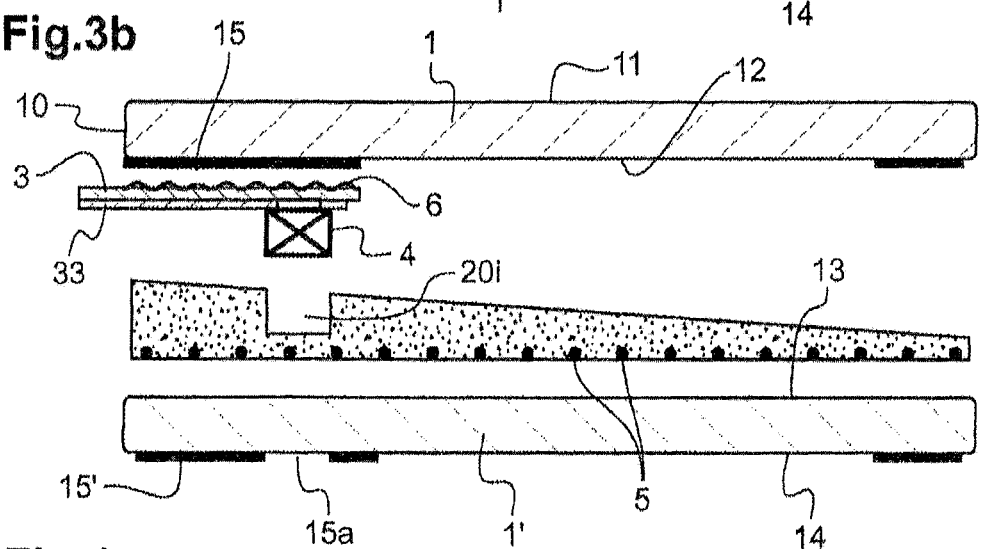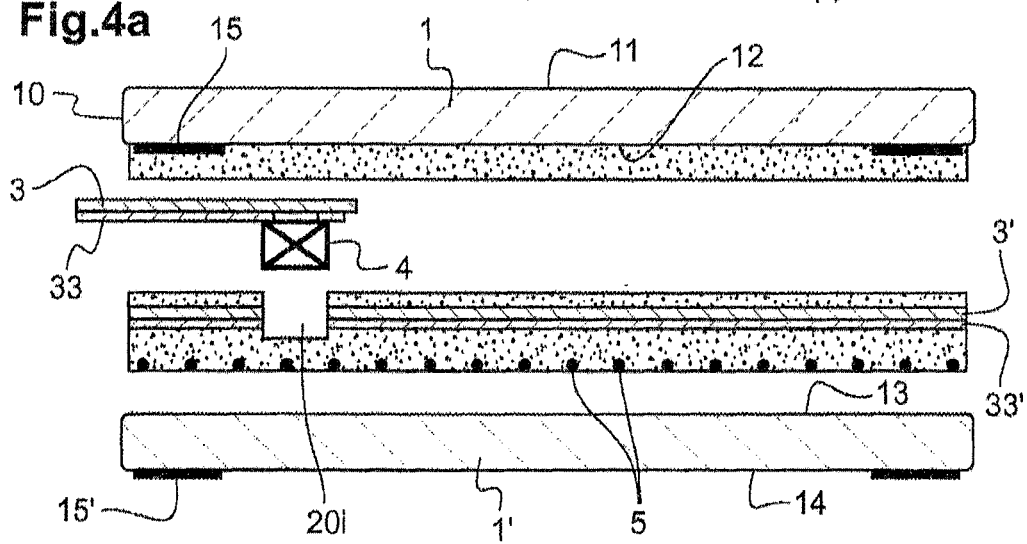

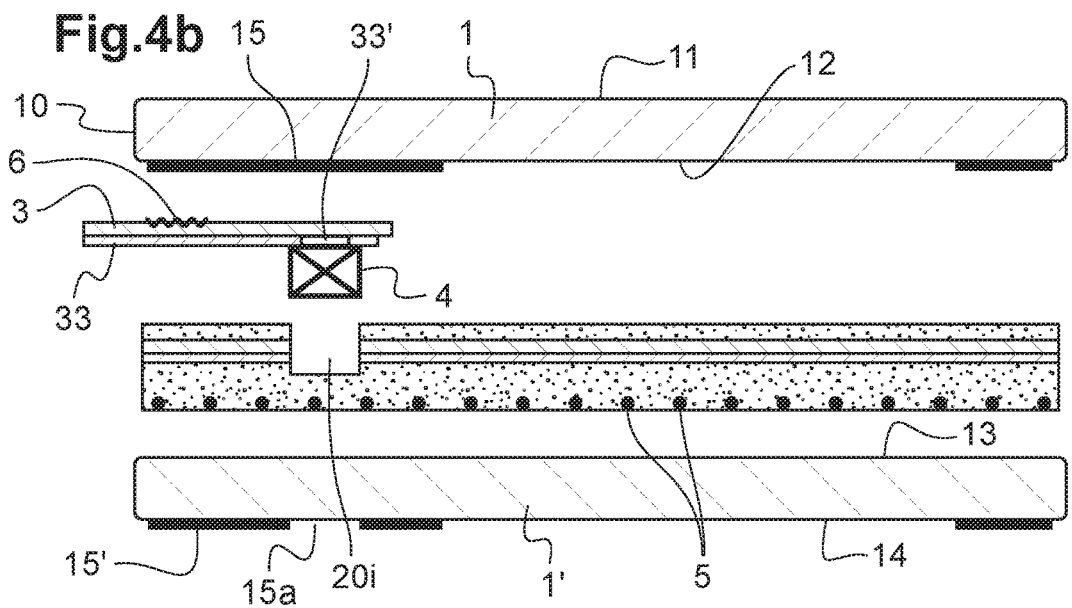
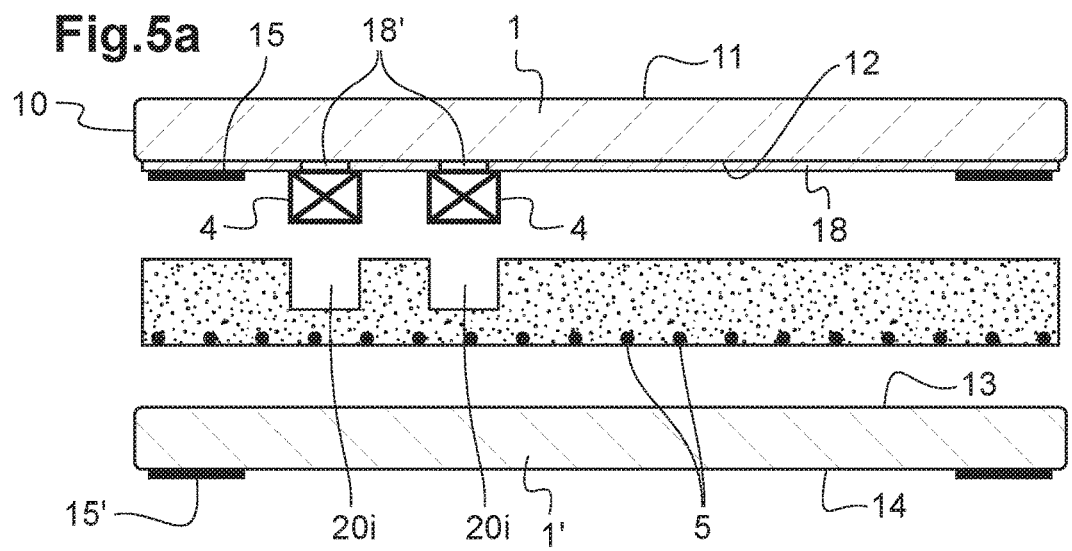
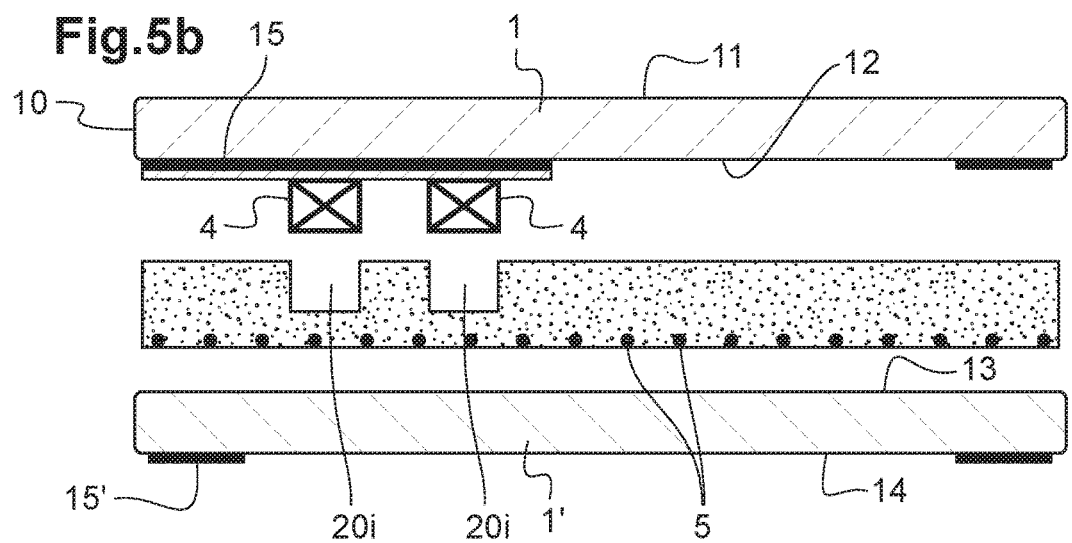

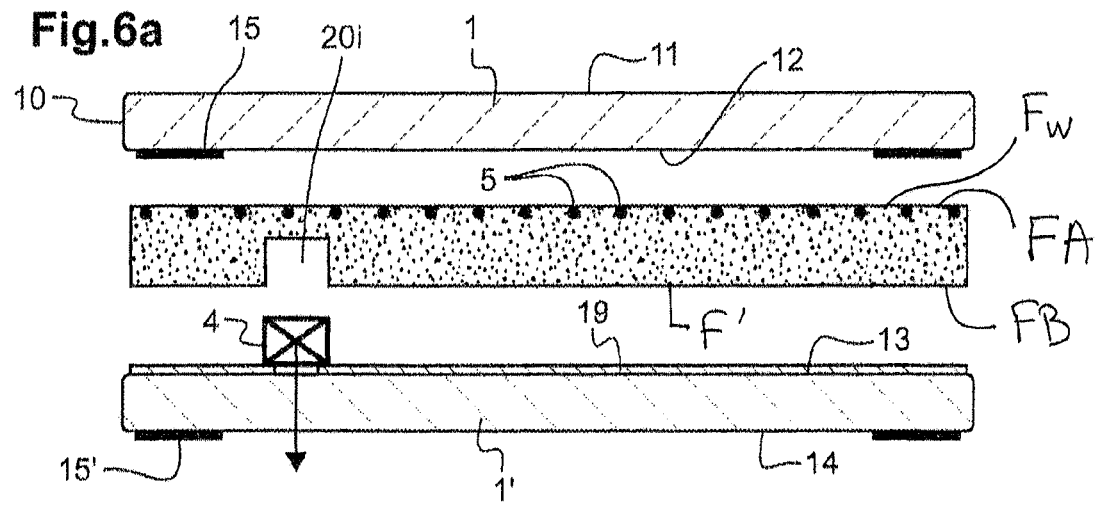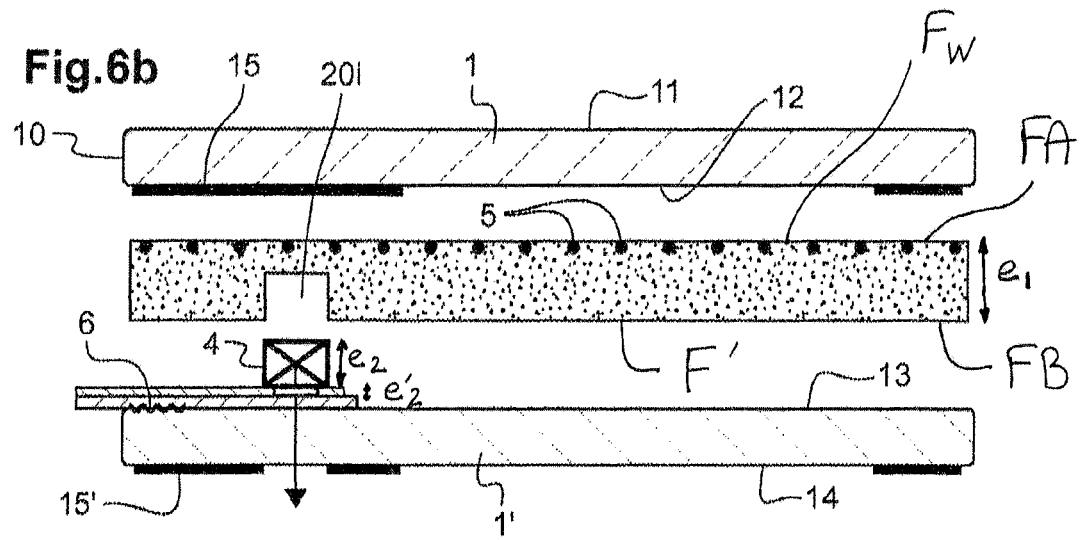

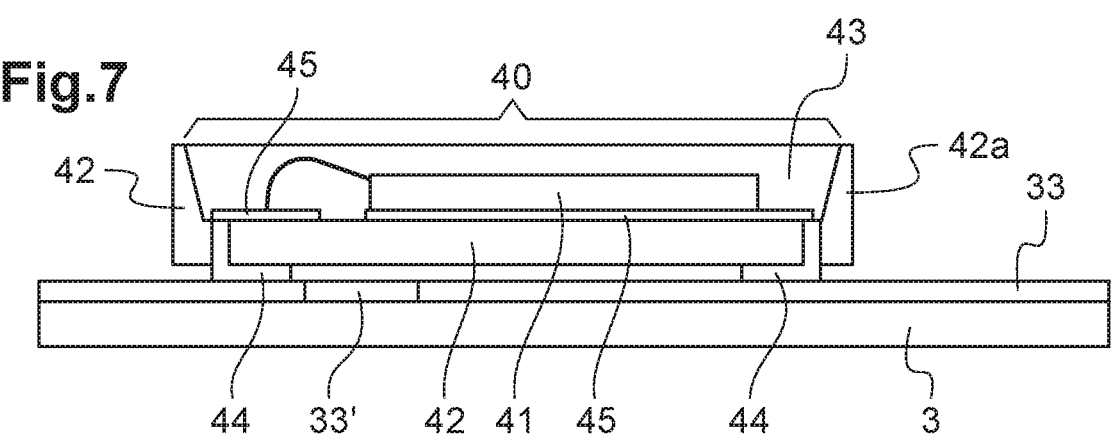

LUMINOUS SIGNALING GLAZING, VEHICLE INCORPORATING SAME AND MANUFACTURE

CROSS-REFERENCE TO RELATED APPLICATIONS

This application is the U.S. National Stage of PCT/FR2017/051193, filed May 17, 2017, which in turn claims priority to French patent application number 1654732 filed May 26, 2016. The content of these applications are incorporated herein by reference in their entireties.

FIELD

The invention relates to a luminous signaling glazing and to a vehicle including such a glazing and to the manufacture of such a glazing.

BACKGROUND

Front windshields increasingly integrate head-up displays (HUDs).

Document DE102013003686 describes a luminous laminated glazing forming a front windshield of an automotive vehicle, integrating diodes on a printed circuit board (PCB) in order to deliver luminous signals to alert the driver.

More precisely, in the embodiment described with reference to FIG. 2 of this document, the luminous signaling front windshield comprises:
- a laminated glazing including:
  - a first glazing forming the exterior glazing, with first and second main faces;
  - a lamination interlayer; and
  - a second glazing forming the interior glazing, with third and fourth main faces; the second and third faces being the internal faces of the glazing; and
- a set of diodes on a printed circuit board, said diodes being able to emit a red signaling light to warn the driver, each diode having an emitting face emitting in the direction of the interior glass,
- the lamination interlayer containing a through-aperture in which the PCB board is placed for its integration.

The rejection rate of this glazing could be improved and thereby its manufacturing cost decreased.

SUMMARY

For this purpose, the first subject of the present application is a luminous (internal) signaling glazing for a vehicle front windshield comprising:
- a laminated glazing including:
  - a first glazing, made of optionally clear, extra-clear or tinted, in particular grey or green, and preferably curved mineral glass forming the exterior glazing, with first and second main faces, called face F1 and face F2, respectively, of thickness, for an automotive glazing, of preferably at most 2.5 mm and even of at most 2.2 mm—in particular 1.9 mm, 1.8 mm, 1.6 mm and 1.4 mm—or even of at most 1.3 mm or at most 1 mm;
  - a second glazing, made of preferably curved and preferably clear or extra-clear or even tinted mineral glass, forming the interior glazing, with third and fourth main faces, face F3 and face F4, respectively, preferably of thickness, for an automotive glazing, smaller than that of the first glazing, even of at most 2.2 mm—in particular 1.9 mm, 1.8 mm, 1.6 mm and 1.4 mm—or even of at most 1.3 mm or at most 1 mm, the total thickness of the first and second glazings preferably being strictly smaller than 4 mm and even than 3.7 mm,
  - between the face F2 and the face F3, which are the internal faces of the laminated glazing, an optionally clear, extra clear or tinted, in particular grey or green, lamination interlayer made of preferably thermoplastic polymeric material and better still even of polyvinyl butyral (PVB), of thickness e1 for an automotive glazing of preferably at most 1.8 mm, better still at most 1.2 mm and even at most 0.9 mm (and better still at least 0.3 mm and even at least 0.5 mm), in particular set back from the edge face of the first glazing by at most 2 mm and set back from the edge face of a second glazing by at most 2 mm, lamination interlayer having a main face FA face F2 side (and even making adhesive contact) and a main face FB face F3 side (and even making adhesive contact).
- at least one inorganic light-emitting diode and preferably a set of inorganic light-emitting diodes for example on a so-called front face facing the face F3, front face of a diode carrier, each diode being (having an emitting face) able to emit signaling light in the direction of the face F3, —each diode having an edge face-, each diode (with or without optics) being of submillimeter-sized thickness e2 of preferably at least 0.2 mm and the optional diode carrier being of thickness e'2 preferably of at most 0.2 mm and e'2≤e1—in particular e2+e'2≤e1—
- the lamination interlayer having a aperture Furthermore, according to the invention:
- the glazing furthermore includes a set of electrically conductive wires anchored on a face called Fw of the lamination interlayer, which is either the face FA or the face FB (preferably),
- and
- For each diode, the lamination interlayer comprises, on the face opposite the face Fw, called face F' (preferably the face FA), a blind aperture housing the diode (surrounding the edge face of the diode), and in particular the lamination interlayer is in the so-called interdiode space between neighboring diodes that are in separate blind apertures, and/or, for a group of diodes, the lamination interlayer comprises, on the face opposite the face Fw, called face F' (preferably the face FA), an aperture that is blind and common, housing (surrounding) said group of diodes
- the remaining thickness Hf of the lamination interlayer, between Fw and the bottom of the blind aperture, preferably being at least 0.1 mm and even 0.2 mm and of at most 0.5 mm and even of at most 0.3 mm
- and preferably (the front surface of) the diode (or each diode of said group) makes contact with the bottom delimiting the blind aperture or is spaced apart from the bottom by at most 0.2 mm or at most 0.1 mm.

Cutting an aperture into which the PCB board would fit in its entirety, as done in the prior art, increases the risk of defective assembly (bubbles, delamination, esthetic defects). Thus, the present invention proposes producing local cutouts in the lamination interlayer, which are furthermore chosen to be blind in order not to degrade the electrically conductive wires.

Similarly, the second subject of the present application is an automotive (externally) signaling glazing chosen from a rear windshield and a door glass, comprising;

a laminated glazing including:
- a first glazing, made of in particular curved and optionally clear, extra-clear or (preferably) tinted, in particular grey or green, mineral glass forming the exterior glazing, with first and second main faces called face F1 and face F2, respectively, preferably of thickness for an automotive glazing of at most 2.5 mm and even of at most 2.2 mm—in particular 1.9 mm, 1.8 mm, 1.6 mm and 1.4 mm—or even of at most 1.3 mm or at most 1 mm;
- a second glazing, made of in particular curved and optionally clear, extra-clear or even tinted, in particular grey or green, mineral glass forming the interior glazing, with third and fourth main faces, face F3 and face F4, respectively, preferably of thickness for an automotive glazing smaller than that of the first glazing, even of at most 2 mm—in particular 1.9 mm, 1.8 mm, 1.6 mm and 1.4 mm—or even of at most 1.3 mm or of at most 1 mm, the total thickness of the first and second glazings preferably being strictly smaller than 4 mm, and even than 3.7 mm between the face F2 and the face F3, the internal faces of the laminated glazing, an optionally clear, extra clear or tinted, in particular grey or green, lamination interlayer made of preferably thermoplastic polymeric material and better still even of PVB, of thickness e1 for an automotive glazing of preferably at most 1.8 mm, better still at most 1.2 mm and even of at most 0.9 mm (and better still at least 0.3 mm or 0.38 mm and even at least 0.7 mm), in particular set back from the edge face of the first glazing by at most 2 mm and set back from the edge face of a second glazing by at most 2 mm, lamination interlayer having a main face FA face F2 side (and even making adhesive contact) and a main face FB face F3 side (and even making adhesive contact);

At least one inorganic light-emitting diode and preferably a set of inorganic light-emitting diodes, able to emit signaling iight in the direction of the face F2, —each diode having an emitting face (of a semiconductor chip)—each diode having an edge face, the lamination interlayer having a blind aperture.
Furthermore, according to the invention,
the glazing furthermore includes a set of electrically conductive wires anchored on a face called Fw of the lamination interlayer, which is either the face FA (preferably) or the face FB
and
for each diode, the lamination interlayer comprises, on the face opposite the face Fw, called face F' (which is preferably the face FB), a blind aperture housing (surrounding the edge face of) the diode, and in particular the lamination interlayer is in the so-called interdiode space, between neighboring diodes that are in separate blind apertures
and/or, for a group of diodes, the lamination interlayer comprises, on the face opposite the face Fw, called F', which is preferably the face FB), an aperture that is blind and common (surrounding) housing said group of diodes
the remaining thickness Hf of the lamination interlayer, between Fw and the bottom of the blind aperture, preferably being at least 0.1 mm and even at least 0.2 mm and of at most 0.5 mm and even of at most 0.3 mm
and preferably the (front surface of) the diode making contact with the bottom bounding the blind aperture or is spaced apart from the bottom by at most 0.2 mm or at most 0.1 mm.

BRIEF DESCRIPTION OF THE DRAWINGS

The present invention will now be described in greater detail with reference to the appended figures, in which:

FIG. 1b is shows another front windshield of an automotive vehicle on a road, which windshield is provided with luminous signaling means according to the invention.

FIG. 1b is shows a PCB board that protrudes from the edge face of the glazing.

FIG. 1' shows another front windshield of an automotive vehicle on a road, the windshield being provided with luminous signaling means according to the invention.

FIG. 1ter is a schematic front view of a luminous signaling rear windshield in one embodiment of the invention.

FIG. 2 is a schematic transverse cross-sectional view of a luminous signaling front windshield in a first embodiment of the invention, as are FIGS. 2a, 2b, 2', 2"a, 3a, 3b, 4a, 4b, 5a, 5b, 6a, 6b.

FIG. 7 shows a surface mount diode mounted on a diode carrier.

DETAILED DESCRIPTION

Figure 1:
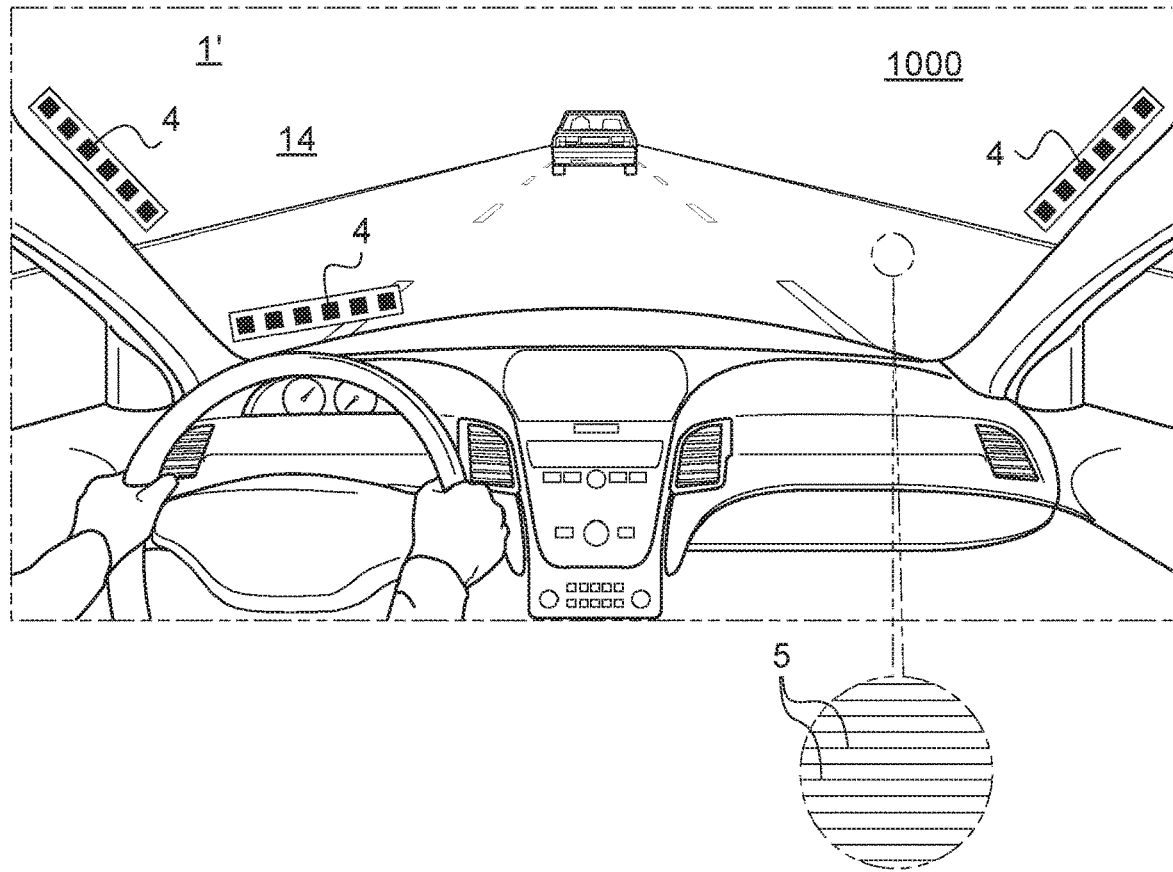
FIG. 1 shows a front windshield of an automotive vehicle on a road, the windshield being provided with luminous signaling means according to the invention.
Figure 1:
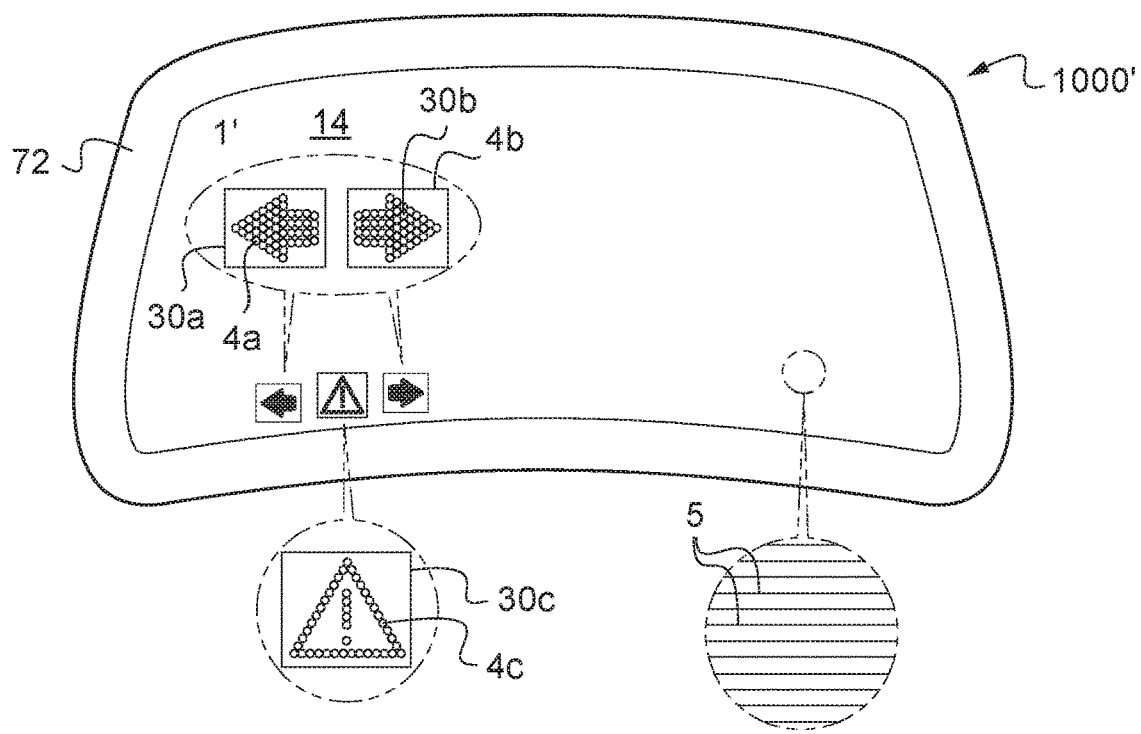

The first subject of the present application is a luminous (internal) signaling glazing for a vehicie front windshield comprising:
- a laminated glazing including:
  - a first glazing, made of optionally clear, extra-clear or tinted, in particular grey or green, and preferably curved mineral glass forming the exterior glazing, with first and second main faces, called face F1 and face F2, respectively, of thickness, for an automotive glazing, of preferably at most 2.5 mm and even of at most 2.2 mm—in particular 1.9 mm, 1.8 mm, 1.6 mm and 1.4 mm—or even of at most 1.3 mm or at most 1 mm;
  - a second glazing, made of preferably curved and preferably clear or extra-clear or even tinted mineral glass, forming the interior glazing, with third and fourth main faces, face F3 and face F4, respectively, preferably of thickness, for an automotive glazing, smaller than that of the first glazing, even of at most 2.2 mm—in particular 1.9 mm, 1.8 mm, 1.6 mm and 1.4 mm—or even of at most 1.3 mm or at most 1 mm, the total thickness of the first and second glazings preferably being strictly smaller than 4 mm and even than 3.7 mm,
  - between the face F2 and the face F3, which are the internal faces of the laminated glazing, an optionally clear, extra clear or tinted, in particular grey or green, lamination interlayer made of preferably thermoplastic polymeric material and better still even of polyvinyl butyral (PVB), of thickness e1 for an automotive glazing of preferably at most 1.8 mm, better still at most 1.2 mm and even at most 0.9 mm (and better still at least 0.3 mm and even at least 0.5 mm), in particular set back from the edge face of the first glazing by at most 2 mm and set back from the edge face of a second glazing by at most 2 mm, lamination interlayer having a main face FA face F2 side (and even making adhesive contact) and a main face FB face F3 side (and even making adhesive contact).
- at least one inorganic light-emitting diode and preferably a set of inorganic light-emitting diodes for example on a so-called front face facing the face F3, front face of a diode carrier, each diode being (having an emitting face) able to emit signaling light in the direction of the face F3, —each diode having an edge face-, each diode (with or without optics) being of submillimeter-sized thickness e2 of preferably at least 0.2 mm and the optional diode carrier being of thickness e'2 preferably of at most 0.2 mm and e'2≤e1—in particular e2+e'2≤e1— the lamination interlayer having an aperture.

The second subject of the present application is an automotive (externally) signaling glazing chosen from a rear windshield and a door glass, comprising;

a laminated glazing including:

a first glazing, made of in particular curved and optionally clear, extra-clear or (preferably) tinted, in particular grey or green, mineral glass forming the exterior glazing, with first and second main faces called face F1 and face F2, respectively, preferably of thickness for an automotive glazing of at most 2.5 mm and even of at most 2.2 mm—in particular 1.9 mm, 1.8 mm, 1.6 mm and 1.4 mm—or even of at most 1.3 mm or at most 1 mm;

a second glazing, made of in particular curved and optionally clear, extra-clear or even tinted, in particular grey or green, mineral glass forming the interior glazing, with third and fourth main faces, face F3 and face F4, respectively, preferably of thickness for an automotive glazing smaller than that of the first glazing, even of at most 2 mm—in particular 1.9 mm, 1.8 mm, 1.6 mm and 1.4 mm—or even of at most 1.3 mm or of at most 1 mm, the total thickness of the first and second glazings preferably being strictly smaller than 4 mm, and even than 3.7 mm between the face F2 and the face F3, the internal faces of the laminated glazing, an optionally clear, extra clear or tinted, in particular grey or green, lamination interlayer made of preferably thermoplastic polymeric material and better still even of PVB, of thickness e1 for an automotive glazing of preferably at most 1.8 mm, better still at most 1.2 mm and even of at most 0.9 mm (and better still at least 0.3 mm or 0.38 mm and even at least 0.7 mm), in particular set back from the edge face of the first glazing by at most 2 mm and set back from the edge face of a second glazing by at most 2 mm, lamination interlayer having a main face FA face F2 side (and even making adhesive contact) and a main face FB face F3 side (and even making adhesive contact);

At least one inorganic light-emitting diode and preferably a set of inorganic light-emitting diodes, able to emit signaling light in the direction of the face F2, —each diode having an emitting face (of a semiconductor chip)—each diode having an edge face, the lamination interlayer having a blind aperture.

The expression "door glass" according to the invention encompasses vent and quarter windows.

In one advantageous embodiment of the present invention, a heating zone of the glazing includes a plurality of such individual metal wires, called "heating metal wires" which connect the "busbars" together. The heating current passes through these individual metal wires. The wires are advantageously very thin so as not to decrease, or only very little, the transparency of the glazing. Preferably, the metal wires have a thickness smaller than or equal to 0.1 mm, in particular comprised between 0.02 and 0.04 mm, and ideally between 0.024 mm and 0.029 mm. The metal wires preferably contain copper, tungsten, gold, silver or aluminum or an alloy of at least two of these metals. The alloy may also contain molybdenum, rhenium, osmium, iridium, palladium or platinum.

The metal wires are preferably electrically isolated, for example by means of claddings. This is particularly useful when the wires are under glazing voltage.

The lamination interlayer is preferably as close as possible to the one or more diodes and preferably, given the tolerance in the position of the one or more diodes during the cutting, the cutout(s) are preferably chosen to be wider than the width of the diode(s) (even if the interlayer is malleable).

In one preferred embodiment the lamination interlayer, in particular made of PVB (or PVB/plastic film such as a PET film with or without an electrically conductive layer/PVB) is spaced apart by at most 0.5 mm and better still at most 0.2 mm or even at most 0.1 mm from the diode edge face and even makes contact with the diode edge face. In particular, even if the blind aperture remains, is filled by the diode or the group of diodes, it may be of smaller width after lamination than before lamination. Specifically, the interlayer may flow during lamination up to the edge face of the diode (of the diodes of the group of diodes) and/or make contact with the front surface of the diode (diodes of the group of diodes). In one preferred embodiment, e1 is subcentimeter-sized, preferably between 0.7 and 0.9 mm (in particular of at least 0.6 mm for conventional PVB and for example of at least 0.8 mm for acoustic PVB), and preferably e1-e2<0.5 mm and even preferably e1-e2 ranges from 0.1 to 0.3 mm. e1 is here preferably the thickness between the face F2 and the face F3.

In particular, in one embodiment, the lamination interlayer is formed from a single, preferably PVB (clear, extra-clear or tinted) leaf with the one or more blind apertures, and the back face of the PCB board is against or adhesively bonded to the face F2 of the front windshield or to the face F3 of the rear windshield or door glass. The one or more blind apertures are preferably produced in said PVB (in particular acoustic and/or wedge-shaped PVB) interlayer.

It may be a question of a (single) composite leaf in particular a preassembled leaf: PVB/plastic film such as a PET functional film with or without an electrically conductive layer/PVB). Each blind aperture is produced in this leaf rather than making each through-hole in a PVB or PVB/optionally functional PET interlayer and to which another PVB with said wires is added before lamination to form a blind aperture. One of the PVBs may be acoustic. One of the PVBs includes the electrically conductive wires. In particular, the plastic film is between the blind aperture and the face Fw or the face Fw is between the blind hole and the plastic film.

The functional plastic film with or without electrically conductive layer may preferably cover all the area of the laminated glazing. The functional plastic film alone may for example be tinted and/or (intentionally) colored. The plastic film with the electrically conductive layer may be transparent and colorless.

The electrically conductive layer preferably remains intact (to esthetic ends, in order to avoid hotspots etc.) and even the film of a plastic such as PET remains intact, without blind or through-hole-therefore without a portion of said blind aperture-.

For example, the lamination interlayer preferably includes a PVB/film of a plastic such as PET with an electrically conductive layer/PVB with said wires and:

the (in particular transparent) electrically conductive layer is unapertured and for example between the bottom of the through hole and the face Fw, (preferably face FB for the front windshield, and face FB for the side window or rear windshield) and in particular makes contact with the PVB facing the or each blind aperture;

and/or the plastic film is an unapertured (in particular transparent) film of a plastic such as PET and for example is between the bottom of the through hole and the face Fw (preferably face FB for the front windshield, and face FB for the side window or rear windshield).

For example, the lamination interlayer preferably includes a PVB with said wires/film of a plastic such as PET with an electrically conductive layer/PVB and:

the (in particular transparent) electrically conductive layer is unapertured;

and/or the (in particular transparent) plastic film is an unapertured film of a plastic such as PET.

In another embodiment, the preferably PVB lamination interlayer may also be present between the back face of the PCB board and the face F2 of the front windshield or between the back face of the PCB board and the face F3 of the rear windshield or door glass. An (in particular clear, extra-clear or tinted) leaf (which may be thinner of thickness for example of at most 0.4 mm and even of at most 0.2 mm) is added for example back-face side of the PCB board. This leaf is preferably of the same extent as the—in particular PVB (or PVB/PET with or without electrically conductive layer/PVB)—leaf with the one or more blind apertures.

In order not to risk generating too many air bubbles, the extra thickness of the interlayer (relative to the diodes) may be as small as possible.

It may be preferred to use a single sheet (of PVB) for the interlayer with the one or more blind apertures for economic reasons (cost of material and simply one series of local cut-outs to make).

The use of a single sheet (of PVB) of preferably standard thickness i.e. 0.6 mm to 0.9 mm (for greater safety rather than 0.38 mm) is made possible by the choice of new ultra-thin power diodes that have only very recently become available on the market.

The blind aperture may be in an optionally acoustic and/or wedge-shaped PVB, in particular for a front windshield, or even in a (preassembled, adhesively bonded) PVB/PVB or plastic film/plastic film/PVB, the plastic film, preferably a PET, bearing an in particular electrically conductive (solar control, etc.) functional layer. To simplify production, the composite element may be an element preassembled with the formation of the one or more blind apertures. In particular the (electrically conductive) functional layer is preferably unapertured, is not passed through by the one or more blind apertures.

The blind aperture is preferably of width (and length) of at most 20 mm and even of at most 15 mm.

The diode or one of the diodes may be a luminous indicator of a preferably capacitive touch on/off switch between F2 and F3 or on the face F4. The luminous indicator may be on the front face of a diode carrier facing the face F3 and that also bears diodes for other functions. As mentioned above, it is possible to use two (or more) leafs (preferably of PVB) as indicated for mechanical strengthening.

For example:
a leaf with blind apertures of thickness of at most 0.5 mm, another leaf of thickness e'1 of at most 0.4 mm, in particular of 0.38 mm, and even at most 0.2 mm, in particular of 0.19 mm.

If the diodes (and the PCB board) are sufficiently thin it may even be possible to invert the thicknesses. For example:

a leaf (preferably of PVB) with the blind apertures of thickness of at most 0.4 mm, in particular of 0.38 mm and even of at most 0.2 mm, and in particular of 0.19 mm; and another sheet (preferably of PVB) of thickness of at most 0.4 mm, in particular of 0.38 mm.

In one preferred embodiment, each preferably power diode is an electronic component including a semiconductor chip, and is equipped with a peripheral polymeric or ceramic package encapsulating the edge face of the electronic component (and defining the edge face of the diode), said package projecting over the front face of the component and encircling the semiconductor chip, the lamination interlayer (because of flow during the lamination) extends as far as to make contact with the front surface between said front surface of the package and the face F3 of the front windshield or the face F2 of the door glass or the rear windshield.

A diode may be of the chip-on-board type or even most preferably a surface mount device (SMD) then including a peripheral package.

In one preferred embodiment, each, preferably power, diode is an electronic component including at least one semiconductor chip and is equipped with a polymeric or ceramic peripheral package encapsulating the edge face of the electronic component (and defining the edge face of the diode), said package surrounding the semiconductor chip. The package may correspond to the maximum thickness (height) e2 of the diode.

The package is for example made of epoxy. A polymeric package may optionally be compressed (the final thickness after lamination may be smaller than the initial thickness) during the lamination. The (poiymeric) package may be opaque.

The package (which is monolithic or made of two parts) may comprise a portion forming a support bearing the chip and a portion forming a reflector that flares with distance from the support above the chip, and containing a protective resin and/or a material having a color conversion function. The front surface may be defined as the surface of this materiai covering the chip, this surface being set back from or level with the "front" surface of the reflector.

The diode may comprise a protective resin or a material having a color conversion function, even just on the semiconductor chip. The semiconductor chip may be embedded in a material (resin, etc.).

The (chips on-board or SMD) diode may be devoid of optical element (above the semiconductor chip (which is optionally embedded in the material) to facilitate compactness.

Preferably, the diodes are surface mount devices mounted on the front face of an in particular flexible diode carrier, for example a PCB board, the diodes even having a Lambertian or quasi-Lambertian emission pattern.

The diode carrier (PCB board) may be sufficiently flexible (malleable) to adapt to the curvatures of the curved laminated glazing.

The diode carrier may be associated with a flat connector that extends as far as to the edge face of the glazing and that even extends beyond said edge face. A flexible connector that is able to adapt to the curvatures of the glazing, including a plastic (PEN or polyimide for example) is preferred. The width (dimension along the edge face) of the flat connector may be smaller than or equal to the dimension of the (diode) carrier in particular along the edge face.

The in particular flexible diode carrier may protrude from the edge face of the glazing. This facilitates the supply of electrical power: for example it is not necessary to add an electrical power supply within the laminated glazing (flat cable, wires, electrically conductive layers on the faces F2 or F3 of the glazings etc.). The (flexible) diode carrier may be local and for example cover less than 10% of the area of the laminated glazing, in particular in a peripheral region of the laminated glazing (front windshield). The (flexible) diode carrier may otherwise cover more than 10% and even all the area of the laminated glazing. The package may correspond to the maximum thickness (height) of the diode. The package is for example made of epoxy. A polymeric package may optionally be compressed (the final thickness after lamination may be smaller than the initial thickness) during the lamination. The (polymeric) package may be opaque.

The diode may be devoid of optical elements (lens etc.) above the semiconductor chip in order to facilitate compactness; however, the optical element may be sufficiently small to be integrated into the laminated glazing. The diode may comprise a protective resin or a material having a color conversion function, conventionally on the semiconductor chip. The semiconductor chip may be embedded in a material (resin etc.).

When the lamination interlayer is brought into contact with the PCB board, the lamination interlayer may be spaced apart by at most 0.5 mm and better still at most 0.1 mm from the edge face of the diodes, and after lamination, because of flow, the lamination interlayer may be closer to and even make contact with the edge face and even project over the front face of the component, while encircling the semiconductor chip.

Preferably, the diodes are surface mount devices mounted on the front face of the PCB board and even the diodes have a Lambertian or quasi-Lambertian emission pattern.

In one preferred embodiment, the lamination interlayer is made of PVB, e1 ranging from 0.5 to 0.9 mm and e1, if relevant, being at most 0.4 mm, and the diodes are surface mount devices mounted on the front face of a flexible diode carrier such as the PCB board, e'2 preferably being at most 0.2 mm, better still at most 0.15 mm and even at most 0.05 mm. The in particular flexible diode carrier may protrude from the edge face of the glazing.

The width of the PCB board is preferably at most 5 cm, better still at most 2 cm, and even at most 1 cm. The width (or length) of a diode with a single semiconductor chip, such diodes generally being square in shape, is preferably at most 5 mm. The length of a diode with a plurality of semiconductor chips (typically surrounded by the package), such diodes generally being rectangular in shape, is preferably at most 20 mm and better still at most 10 mm.

The PCB board (which is preferably flexible enough to follow the curvature of the curved laminated glazing) may be adhesively bonded or held against, via its back face, against the face F2 for the front windshield or against the face F3 for the rear windshield or side window, the adhesive bonding being with an adhesive (glue or preferably double-sided adhesive) of thickness e3 with e3≤0.1 mm, better still e3≤0.05 mm—even such that e3+e'2 is at most 0.15 mm and better still at most 0.1 mm. With this adhesive, preferably e3+e2+e'2≤e1 (above all if present on the back face of the PCB in the zone of the diodes).

The adhesive bonding is over the entire length or discrete, in zones containing and/or not containing diodes. The diodes are preferably power diodes that in operation are undersupplied electrically with current, preferably by a factor of at least 10 and even of at least 20 (therefore current/10 or even current/20) in particular so as to maintain a temperature below the softening temperature of the polymeric material of the lamination interlayer, in particular at most 130° C., better still at most 120° C. and even at most 100° C.

These diodes guarantee an excellent efficiency and do not generate too much heat.

For example for diodes with a current rating of 1 A, a current of between 50 and 100 mA is chosen.

The inorganic diodes are for example based on gallium phosphide, gallium nitride and/or aluminum gallium nitride.

The PCB board may be sufficiently flexible (bendy) to follow the curvatures of the curved laminated glazing.

In one embodiment, the PCB board includes a film made of a preferably transparent (if necessary) plastic, preferably polyethylene terephthalate or PET or polyimide, provided with conductive tracks, in particular made of metal or a transparent conductive oxide, which tracks are preferably transparent, and is equipped with surface mount diodes. The conductive tracks are printed or deposited by any other deposition method, physical vapor phase deposition for example. The conductive tracks may also be wires. It is preferable for the conductive tracks and the film to be transparent when they are visible i.e. they are not masked by a masking element (layer) (such as an enamel or even a coat of paint, etc.) in particular on face F4 or F3 for the front windshield and on face F2 for the side window or rear windshield. The conductive tracks may be transparent either because they are made of a transparent material or because they are thin enough to be (almost) invisible. The tracks, which may be visible, may be made of copper, for example insulated by lines (removal of material by laser etching etc.).

Polyimide films have a better resistance to higher temperatures relative to the alternative PET or even PEN (polyethylene naphthaiate).

Preferably, the PCB board extends at least as far as to the edge face of the laminated glazing, and preferably protrudes beyond the edge face (preferably of dog-legged shape and better still L-shaped), and between the back face of the PCB board and the face F2 of the front windshield or the face F3 of the rear windshield or the door glass, is housed an adhesive that is tight to liquid water and, of thickness of at most 0.1 mm and better still at most 0.05 mm, in particular a double-sided adhesive. Such an adhesive is preferred to an over-molding solution. It may be a question of the preferably transparent adhesive used to fix (all) the PCB board.

The diode carrier, the dog-legged, in particular L-shaped PCB board may include a first (rectangular) portion bearing the diodes (with the bend) and a (rectangular) second portion for connection opening onto and even protruding beyond the edge face of the laminated glazing. This second portion may be (much) longer than the first portion.

The glazing (front windshield, rear windshield, side window) may include a plurality of signaling lights with the same function or separate functions. The front windshield may include a plurality of signaling lights with the same function or separate functions.

In order to obtain a larger signaling area and/or different colors, it is possible to have on a given PCB board a plurality of rows of diodes or even to place side-by-side two PCB boards (at least the zones of the PCBs with diodes being placed side-by-side).

On a given PCB board, the diodes may emit the same light or light of different colors, preferably not at the same time.

Conventionally, the diodes are in (at least) one row forming a luminous strip along
 a longitudinal edge of the front windshield (in particular driver-side) or of the rear windshield or door glass, the diode carrier may protrude from an edge face of a lateral edge and even from the other lateral edge or even and/with a connecting portion protruding from the edge face of the longitudinal edge— or a lateral edge of the front windshield (in particular driver-side) or of the rear windshield or door glass, the diode carrier may protrude from an edge face of a longitudinal edge and even from the other longitudinal edge and/or even with a connecting portion protruding from the edge face of the lateral edge.

Naturally, the lamination interlayer may make direct contact with the face F3 (F2, respectively) or with a conventional functional coating on this face, in particular a stack of thin layers (including one or more silver films) such as: a heating layer, antennae, a solar-control or low-E layer or a decorative or (opaque) masking layer such as a generally black enamel.

The diode carrier, in particular the PCB board, may be in the glazing region and optionally spaced apart from the opaque edges (enamel frame in general). For example, the PCB board is placed along one lateral or longitudinal edge or even more centrally in particular substantially midway between the lateral edges and even closer to the bottom longitudinal edge (in the fitted position) than to the top longitudinal edge. Most often, there is an opaque layer on face F2 and an opaque layer on face F4 or even F3. Their widths are identical or distinct.

The diode carrier, in particular the PCB board (at least the zone with the diodes or at least the zone without the diodes if the PCB is dog-legged and in particular L-shaped) may be arranged in or in the vicinity of the region of an opaque layer, in particular a (black) enamel, along a peripheral edge of the laminated glazing, generally on face F2 and/or face F4 or even on face F2 and/or on face F3.

In a first embodiment, the PCB board may even be placed in a region of the front windshield, region in which the exterior glass is rendered entirely (or partially) opaque by the (outermost) opaque layer, such as a (black) enamel, preferably on F2. This opaque layer may be in this region of the front windshield an unapertured layer (continuous background) or a layer with reserves (areas without opaque layer) for example a layer taking the form of a set of geometric (round, rectangular, square, etc.) or nongeometric patterns of identical or different sizes (of size that decreases with distance from the edge face and/or patterns the spacing of which increases with distance from the edge face).

In this first embodiment, the diodes or even the entire PCB board may be visible only from the interior, in order to display information—such as a warning (anti-collision) to a driver or even to any other person—without limiting the view of the driver through the front windshield.

The PCB board may be placed in a region of the front windshield, region in which the interior glass is rendered opaque by an opaque layer (the innermost) such as a (black) enamel preferably on F4 or even on F3. This opaque layer then includes reserves (by masking on deposition or by removal in particular with a laser) at least in line with the diodes. This opaque layer for example takes the form of a set of optionally geometric (circular, rectangular, square, etc.) opaque patterns that are of identical or distinct size (of size that decreases and/or the patterns getting further and further apart with distance from the edge face). Zones between the opaque patterns are in line with the diodes. In these zones, a scattering layer such as a white enamel may be added to face F4 or even F3. The scattering layer may be spaced apart from or contiguous with this (innermost) opaque layer. Preferably, the front windshield in addition includes the opaque layer on face F2.

The PCB board may be placed in a region of the rear windshield or door glass, region in which the interior glass is rendered opaque by the opaque layer (the innermost) preferably on F4 or even on F3. In this embodiment, the diodes or even the entire PCB board is visible only from the exterior, in order to form any sort of light or information. This opaque layer may be in this region of the rear windshield or door glass an unapertured layer (continuous background) or a layer with reserves (areas without opaque layer) for example a layer taking the form of a set of geometric (round, rectangular, square, etc.) or nongeometric patterns of identical or different sizes (of size that decreases and/or patterns, the spacing of which increases with distance from the edge face) in particular an enamel. Preferably, the rear windshield or door glass in addition includes the opaque layer on face F4 or even F3.

The PCB board may be placed in a region of the rear windshield or door glass, region in which the exterior glass is rendered opaque by an opaque layer (the outermost) such as a (black) enamel preferably on F2. This opaque layer then includes reserves (by masking on deposition or by removal in particular with a laser) at least in line with the diodes. This opaque layer for example takes the form of a set of optionally geometric (circular, rectangular, square, etc.) opaque patterns that are of identical or distinct size (of size that decreases and/or the patterns getting further and further apart with distance from the edge face). Zones between the opaque patterns are in line with the diodes. In these zones, a scattering layer such as a white enamel may be added to face F2. The scattering layer may be spaced apart from or contiguous with this opaque layer. Preferably, the rear windshield or door glass in addition includes the opaque layer on face F4 (or F3).

In particular for visual comfort, the front windshield may include on the face F3 or (better still) the face F4 facing the diodes a preferably white scattering layer, in particular a (white) enamel. in particular for visual comfort, the side window or rear windshield may include facing the diodes a preferably white scattering layer on the face F2 (or even F1), in particular a (white) enamel. Thus, a set of (white) scattering patterns of the size of the diodes (preferably of size suitable for preventing the edges from being dark in the on state) may be obtained.

The scattering layer may be in a zone of the glazing region or as already indicated in a peripheral zone with an opaque layer, such as the black enamel, with reserves in line with the diodes.

In particular, for the rear windshield or door glass, the diodes may be arranged to form one or more letters, a symbol (triangle, fault or hazard symbol, etc.), an arrow, etc. using one or more PCB boards, etc.

In particular, for the front windshield, the diodes may be arranged to form one or more letters, a symbol (triangle, fault or hazard symbol, etc.), one or more arrows (left and right flashing indicators) etc., using one or more PCB boards. As many PCB boards and sets of diodes such as described above as required may be provided. For example:

a first set along a left lateral edge preferably closer to the bottom longitudinal edge than the top longitudinal edge;

a second set along a right lateral edge preferably closer to the bottom longitudinal edge than the top longitudinal edge;

a third set along the bottom longitudinal edge preferably on the driver side; and a fourth set in the center preferably closer to the bottom longitudinal edge than the top longitudinal edge.

Color may change depending on the danger level or a larger or smaller number of diodes may even be turned on depending on the danger level.

The invention of course relates to any vehicle including at least one luminous signaling glazing such as described above and in particular:

the luminous signaling glazing forms a front windshield and is an (open road (freeway) or even urban road) anti-collision means in particular preventing collisions by detecting when the distance to the automobile (or any other means of locomotion such as a motorbike, bicycle, mobility scooter etc. or even an animal) in front (or an object or a person such as a pedestrian) is too small, or even by detecting when a distance from an object or a person or an automobile or even any other means of locomotion (bicycle, motorbike, etc.) on the left-hand or right-hand side of the automobile is too small, and turning on the preferably red or, more gradually, orange (amber) then red diodes, or even diodes with three or more levels and therefore colors;

or the luminous signaling glazing forms the rear windshield and is a glazing including a stop light (for example of at least 60 cd), a third stop light (for example between 25 and 80 cd), an indicator (for example of at least 50 cd), a hazard warning light or a light for locating the vehicle;

the luminous signaling glazing forms a side window and is a glazing including a hazard warning light (for when the car breaks down, etc.) or a light for locating the vehicle (when stopped, in a parking lot, in town, etc.) or a side repeater (front side window, in particular near the side mirror—in order to be seen when the vehicle is being overtaken, for example between 0.6 and 20 cd).

It is also possible to form position lights, parking lights and/or sidelights.

By way of diodes, mention may be made of the OSLON BLACK FLAT range sold by OSRAM. For red light, mention may be made of the following diode, which is sold by OSRAM: OSLON BLACK FLAT Lx H9PP. For orange (amber) light, mention may be made of the following diode, which is sold by OSRAM: LCY H9PP. For white light, mention may be made of the following diodes, which are sold by OSRAM: LUW H9QP or KW HxL531.TE where x=is the number of chips in the diode (4 or 5 for example).

By way of flexible PCB, mention may be made of the AKAFLEX® range of products (in particular the PCL FW) from KREMPEL.

In one embodiment of the vehicle, it includes at least one control unit for piloting the diodes and even at least one sensor in particular for detecting dangerous situations. A control unit for piloting the diodes may be in the laminated glazing, on or off the PCB board.

The invention lastly relates to a process for the luminous signaling glazing such as described above in that it includes the following steps:

automatically cutting (using a robot) the lamination interlayer taking the form of a sheet (preferably of PVB) bearing said electrically conductive wires, sheet of thickness of at most 0.9 mm and even of at most 0.4 mm thickness, to form preferably as many (and no more) local blind apertures (geometric apertures: round, square, rectangular etc., and in particular apertures of the same shape as the diodes) as there are diodes or including a first sheet of a thickness of at most 0.9 mm in order to form local blind apertures, the lamination interlayer furthermore including a second sheet, in particular of a thickness of at most 0.4 mm and even of at most 0.2 mm, this sheet preferably being of optionally acoustic and/or wedge-shaped PVB, or a preassembled multileaf consisting of a PVB/plastic film such as functional PET film or PVB/plastic film such as functional PET film in particular bearing an electrically conductive layer/PVB, film of a plastic such as PET of thickness of at most 0.2 mm and even of at most 0.1 mm or at most 0.05 mm, and assembling the laminated glazing, with blind apertures larger than the size of the diodes preferably larger by at most 1 mm, better still 0.5 mm or even at most 0.2 mm or 0.1 mm, An optional second sheet preferably made of PVB being between the back face of the in particular flexible, local diode carrier, and of thickness of at most 0.2 mm and even of at most 0.1 mm or of at most 0.05 mm and the face F2 of the front windshield or between the back face of the in particular flexible, local diode carrier and of thickness of at most 0.2 mm and even at most 0.1 mm or of at most 0.05 mm and the face F3 of the rear windshield or door glass.

The diodes may be placed on the front face manually or automatically (higher precision).

It is possible to choose a PVB that is conventional in the motor-vehicle world, such as RC41 from Solutia or Eastman. The PCB board with the diodes may be positioned with respect to the glazing (back-face side) and constrain, the placement of the holed lamination interlayer with the one or more blind apertures, the lamination interlayer preferably being cut so that there is a surplus past the edge of the glazing (the excess being cut off after the glazing has been fitted front face side, or indeed the PCB board with the diodes may be positioned with respect to the lamination interlayer holed partially in its thickness (blind aperture(s)) and is constrained by the placement of the latter, the lamination interlayer then preferably being cut to the exact shape of the laminated glazing.

The electrically conductive wires may make contact with an (unapertured, acoustic, tinted, wedge-shaped, etc.) PVB leaf or make contact with the face F3 (for the front windshield preferably) or F2 (for the rear windshield or the side window preferably).

The first sheet may be a preassembled multileaf consisting of a PVB/film of a plastic such as PET preferably including an electrically conductive layer/PVB, the one or to more blind apertures are produced in the PVB (side face opposite the electrically conductive wires, therefore apertures preferably face FA side for the front windshield and FB side for the side window or rear windshield) without reaching the electrically conductive layer and preferably the film of a (optionally transparent) plastic such as PET has a thickness of at most 0.2 mm and better still of at most 0.15 mm and even of at most 0.05 mm.

In a case with the PVB/film of a plastic such as PET including an optionally electrically conductive layer/PVB, the PVB with the electrically conductive wires includes the one or more blind apertures and the other PVB serves to add an (acoustic etc.) functionality. In one case, the PVB with the one or more blind apertures does not include the electrically conductive wires and the other PVB includes the electrically conductive wires. The PET plastic film may be a complementary protection of the electrically conductive wires.

The one or more blind apertures may be produced in the preassembled PVB/film of a plastic (with or without layer) such as PET/PVB multileaf without anchoring the wires or one of the PVBs may have the wires before making the aperture. The electrically conductive wires may be on a free surface of the preassembled multileaf or even on a surface oriented toward the plastic film.

The electrically conductive wires may be on a free surface of the pre-assembled multileaf and then the electrically conductive wires may make contact with another (unapertured, acoustic, tinted, wedge-shaped etc.) PVB leaf or make adhesive contact with the face F2 or F3.

for the front windshield, the face FA is the face F' and preferably makes adhesive contact with the face F2 and/or the face Fw is the face FB, which preferably makes adhesive contact with the face F3, or in that, for the door glass or the rear windshield, the face FA is the face Fw and preferably makes adhesive contact with the face F2 and/or the face FB is the face F', which preferably makes adhesive contact with the face F3.

This film of a plastic such as PET may cover all the area of the laminated glazing, and the diode carrier (PCB board, film of a transparent plastic such as PET, polyimide, inter alia) may be local.

In the present description, the term side window or door glass designates the same thing.

FIG. 1 shows (as seen from inside the vehicle) a front windshield 1000 of an automotive vehicle being driven on a three-lane road with an automobile in front.

The front windshield is a laminated glazing with luminous signaling means according to the invention, namely:
- a first set of six diodes 4 on a first PCB printed circuit board integrated between the two glazings of the laminated glazing, said diodes being in a row and placed in the glazing region in an edge zone of the front windshield along the bottom longitudinal edge and optionally in or in the vicinity of a peripheral masking zone (opaque enamel, etc.) of the exterior glazing (not shown) or even in a zone, of the exterior and/or interior glazing, containing an alternation of masking zones (opaque layer, such as an opaque enamel) and transparent zones (facing a diode);
- a second set of six diodes 4 on a second PCB printed circuit board integrated between the two glazings of the laminated glazing, said diodes being in a row and placed in the glazing region in an edge zone of the front windshield along the in particular driver-side (left-hand) lateral edge and optionally in or in the vicinity of a peripheral masking zone (opaque enamel, etc.) of the exterior glazing or even in a zone, of the exterior and/or interior glazing, containing an alternation of masking zones (opaque layer, such as an opaque enamel) and transparent zones (facing a diode); and
- a third set of six diodes 4 on a third PCB printed circuit board integrated between the two glazings of the laminated glazing, said diodes being in a row and placed in the glazing region in an edge zone of the front windshield along the in particular passenger-side (right-hand) lateral edge, and optionally in or in the vicinity of a peripheral masking zone (opaque enamel, etc.) of the exterior glazing or even in a zone, of the exterior and/or interior glazing, containing an alternation of masking zones (opaque layer, such as an opaque enamel) and transparent zones (facing a diode).

The diodes of the first set may in particular emit red light alerting the driver when the automobile in front (or any other means of locomotion or even an animal) is detected to be too close. The red light may be continuous or flash. If the light is chosen to be continuous, its intensity may increase as the automobile in front gets closer or from a preset distance said to be of "high-risk". If the light is chosen to flash, its frequency may increase as the automobile in front gets closer or from a preset distance said to be of "high-risk".

When the automobile in front is sufficiently far away (a safe distance away), the diodes are turned off.

The diodes of the second set may in particular emit red light alerting the driver when an automobile (or any other means of locomotion or even an animal) is detected to be too close to the left-hand side of the automobile. The red light may be continuous or flash. If the light is chosen to be continuous, its intensity may increase as the automobile to the side gets closer or from a preset distance said to be of "high-risk". If the light is chosen to flash, its frequency may increase as the automobile to the side gets closer or from a preset distance said to be of "high-risk". When the automobile to the side is sufficiently far away (a safe distance away), the diodes are turned off.

The diodes of the third set may in particular emit red light alerting the driver when an automobile (or any other means of locomotion or even an animal) is detected to be too close to the right-hand side of the automobile. The red light may be continuous or flash. If the light is chosen to be continuous, its intensity may increase as the automobile to the side gets closer or from a preset distance said to be of "high-risk". If the light is chosen to flash, its frequency may increase as the automobile to the side gets closer or from a preset distance said to be of "high-risk". When the automobile to the side is sufficiently far away (a safe distance away), the diodes are turned off.

The anti-collision system functions on any road: freeway, in town. It may also serve to warn of the presence of an object or pedestrian that is too close.

The signaling light may also pass from one color (for example orange or amber) when the vehicle is at a risky distance to another color, red for example, when the vehicle is at a smaller and even more dangerous distance.

In these cases, provision may be made for as many diodes as necessary, for example one row with red and orange diodes in alternation, or one row of diodes per color. It is also possible to make provision for at least three signaling levels (three colors).

The vehicle integrates at least one sensor (preferably one per set of diodes) in order to detect these dangerous situations (unsafe distances, inter-alia) and at least one control unit for piloting the diodes.

The diodes are not necessarily in rows, in particular parallel to the edge of the glazing.

The one or more PCB boards with the diodes are preferably in the lower quadrant driver side. Being in the glazed region, a transparent PCB board is preferred.

The front windshield includes a set of metal wires 5 that are almost invisible, for example of 50 µm thickness, which are placed on a face face F3 side of the lamination interlayer (over all Its area), in the form of lines that are optionally straight.

FIG. 1b is shows another windshield of an automotive vehicle, which windshield 1000' is provided with luminous signaling means according to the invention. It differs from the windshield in FIG. 1 in the type of signaling produced and in the position of the second and third PCB boards.

The first set of diodes 4c, on a carrier 30C, forms a triangle with, if possible, a central exclamation mark. It therefore forms a danger warning light.

The second and third sets of diodes 4a and 4b, on their respective carriers 30a and 30b, form arrows indicating that the respective indicator has been activated.

The front windshield includes a set of metal wires 5 that are almost invisible, for example of 50 µm thickness, which are placed on a face face F3 side of the lamination interlayer (over all its area), in the form of lines that are optionally straight.

FIG. 1' shows another front windshield of an automotive vehicle on a road, the windshield being provided with luminous signaling means according to the invention. It differs from the windshield in FIG. 1 in the more peripheral location of the three PCB boards, which may be opaque (opaque carrier and/or opaque conductive (wires etc.) tracks). The face F2 includes an unapertured masking frame, preferably made of black enamel, and the face F4 (or F3) includes a masking frame, preferably made of black enamel, with apertures in line with the diodes.

The front windshield includes a set of metal wires 5 that are almost invisible, for example of 50 μm thickness, which are placed on a face face F3 side (over all the area) of the lamination interlayer, taking the form of lines that are optionally straight.

FIG. 1ter is a schematic front view (face-F1 or face-12 side) of an externally luminous signaling rear windshield 300 in one embodiment of the invention.

In the central zone L3 a third stop light 101 is formed with, for example, six red diodes on the PCB board along the top longitudinal edge.

In each lateral zone L4, an indicator 102 is formed for example with six diodes emitting in the yellow on the PCB board along the lateral edge in question, or even a signaling light 103 with for example six diodes on the PCB board along the lower longitudinal edge in question.

The front windshield includes a set of metal wires 5 that are almost Invisible, for example of 50 μm, which are placed on a face face F2 side of the lamination interlayer (over all its area), in the form of lines that are optionally straight.

Alternatively, a side repeater is formed on a side window in the same way.

FIG. 2 is a schematic cross-sectional view of a luminous signaling front windshield in a first embodiment of the invention, comprising a curved laminated glazing including:
  a first glazing 1, for example made of TSA glass and of 2.1 mm thickness, forming the, preferably tinted, exterior glazing, with first and second main faces 11, 12 respectively called face F1 and face F2, and an edge face 10;
  a preferably clear lamination interlayer 20 made of a polymeric material, here of PVB, of preferably sub-millimeter-sized thickness, for example a PVB (RC41 from Solutia or Eastman) of about 0.76 mm thickness or as a variant if necessary a (trilayer or quadlayer) acoustic PVB for example of about 0.81 mm thickness, the face FB face F3 side bearing a set of metal wires 5 covering (substantially) the surface in particular facing the one or more diodes;
  a second glazing 1', forming the interior glazing, for example made of TSA (or clear or extra-clear) glass and of 2.1 mm or even 1.6 mm or even smaller thickness, with third and fourth main faces 13, 14 respectively called face F3 and face F4, face F4 optionally being coated with a functional layer (low-E layer, etc.), the face F2 and the face F3 being the internal faces 12, 13 of the laminated glazing; and
  a set of inorganic light-emitting diodes 4, which are surface mount devices (SMDs), for example emitting in the red on a PCB printed circuit board 3, the PCB board+diodes assembly being of total thickness et2≤e1 and better still with e1−et2 of at most 0.5 mm and preferably of 0.1 mm to 0.2 mm, the diodes being of thickness e2 and the PCB board 3 of thickness e'2, with a face called the front face 30 facing the face F3 and a back face 30' facing the face F2, each diode having an emitting face emitting in the direction of the interior glazing 1', and each diode having an edge face.

For each of the diodes, the lamination interlayer has a region 21 comprising a blind aperture surrounding the edge face of the diode and making contact with the edge face and even the bottom wall forming the aperture possibly making contact with the diode 4.

The lamination interlayer 20 is present in the laminated glazing between the face F3 and the front face of the PCB board 3 over the entirety of the front face of the PCB board excluding diodes. The lamination interlayer 22 is also present between the face F2 and the back face 30'.

The diodes (with a single semiconductor chip here) are square in shape and of width of about 5 mm or less.

The thinnest possible and even preferably the discreetest possible flexible PCB board 3 (minimum width or even transparent), for example including a transparent film such as a film of PET, PEN or a polyimide, will be chosen, and, even for the printed circuit, transparent connection tracks may be chosen (rather than tracks made of copper unless they are made sufficiently thin). The PCB board protrudes from the edge face 10.

The front windshield includes a frame 15 made of black enamel on face F2 and a frame 15' made of black enamel on face F4.

FIG. 2a shows an exploded view of this glazing showing the use of two PVB leaves:
  the leaf with the blind holes 20i, with a remaining thickness Hf, this leaf for example being acoustic; and
  the leaf 22 that Is the so-called back leaf, on the side of the back face 30'.

In one variant of FIG. 2, an exploded view of which is shown in FIG. 2b or an assembled view of which is shown in FIG. 2:
  the so-called back leaf is replaced by a tight adhesive 6 on the back face 30' of the flexible diode carrier 3;
  a reserve 15a is produced in the enamel layer 15' on face F4 in order to let the light pass from the diode 4 which is more peripheral here; and
  optionally the flexible diode carrier with the tracks 33 is opaque (because masked by the layers 15, 15').

In one variant of FIG. 2, an exploded view of which is shown in FIG. 2"a:
  the transparent and flexible diode carrier 3, which is for example made of PET, with a (transparent) conductive layer 33 is no longer local but covers the main faces, for example for a solar-control function;
  two separate blind apertures for housing two diodes 4 are shown here;
  the two PVB leaves 21, 22 are therefore separate here.

In one variant of FIG. 2a, an exploded view of which is shown in FIG. 3a:
  the leaf with the blind apertures 20i is wedge-shaped, the diodes 4 in particular being in the so-called top portion 21a of the PVB (and therefore the top portion of the front windshield) which is thicker than the bottom portion 21b of the PVB.

In one variant of FIG. 3a, an exploded view of which is shown in FIG. 3b:
  the back leaf is removed and replaced by a tight adhesive 6 on the back face 30' of the flexible diode carrier 3 for example with tracks 33 made of copper;
  a reserve 15a is produced in the enamel layer 15' on face F4 in order to let the light pass from the here more peripheral diode 4.

In one variant in FIG. 2, an exploded view of which is shown in FIG. 4a, the leaf with the blind apertures is a (preassembled) multilayer for example: PVB/PET plastic film comprising a functional layer such as an electrically conductive (solar control etc., in particular a stack containing silver) layer/PVB with the electrically conductive wires. The blind aperture 20i may, as shown here, pierce the PET 3' and the electrically conductive layer 33' (face F3 side or even face F2 side) or may, in one variant, leave the electrically conductive layer 33' and even the PET 3' intact.

In one variant of FIG. 4a, the electrically conductive wires are between the first PVB and the PET 3'. The blind aperture therefore stops before the wires, the PET and the layer 33'.

In one variant of FIG. 4a, an exploded view of which is shown in FIG. 4b:
the back leaf is removed and replaced by a tight adhesive 6 on the back face 30';
a reserve 15a is produced in the enamel layer 15' on face F4 in order to let the light pass from the here more peripheral diode 4.

The blind aperture 20i may, as shown here, pierce the PET and the electrically conductive layer or may, in one variant, leave the electrically conductive layer and even the PET intact.

In one variant of FIG. 2, 2b, 2',2"a, 3a, 3b 4a or 4b, a PVB leaf is added between the face Fw and the face F3.

In one variant of FIG. 2, an exploded view of which is shown in FIG. 5a:
the back leaf and the diode carrier are removed;
the diodes 4 are mounted on a surface of an electrically conductive (and optionally also solar-control) layer 18 covering the face F2, for example with solder or conductive glue.

In one variant of FIG. 5a, an exploded view of which is shown in FIG. 5b, the electrically conductive (and optionally also solar-control) layer 18, which for example is opaque like a silver-containing enamel, is on the masking enamel 15.

In one variant of FIG. 2, an exploded view of which is shown in FIG. 6a:
the diodes 4 are mounted on a surface on an electrically conductive (and optionally also solar-control) layer 18 covering the face F3, and the diodes 4 are reverse-mount diodes;
the electrically conductive wires 5 are on the face FA F2 side of the PVB interlayer and therefore the blind aperture is F3 side.

In one variant of FIG. 6a, an exploded view of which is shown in FIG. 6b:
the diodes are still reverse-mount diodes 4 but are on a PCB carrier 2 on the face F3;
a reserve 15a is produced in the enamel layer 15' on face F4 in order to let the light pass from the here more peripheral diode 4.

A diode may be of the chip-on-board type or even most preferably a surface mount device (SMD) then including a peripheral package.

In one preferred embodiment shown in FIG. 7, each diode is an electronic component including at least one semiconductor chip 41, and is equipped with a polymeric or ceramic peripheral package 42 encapsulating the edge face 42a of the electronic component (and defining the edge face of the diode), said package surrounding the semiconductor chip.

The package may correspond to the maximum thickness (height) e2 of the diode. The package is for example made of epoxy. A polymeric package may optionally be compressed (the final thickness after lamination may be smaller than the initial thickness) during the lamination. The (polymeric) package may be opaque.

The package (which is monolithic or made of two parts) may comprise a portion 42 forming a support bearing the chip and a portion forming a reflector that flares with distance from the support above the chip, and containing a protective resin 43 and/or a material having a coior conversion function. The front surface 40 may be defined as the surface of this material covering the chip, this surface being set back from or level with the "front" surface of the reflector.

The diode may comprise a protective resin or a material having a color conversion function, even just on the semiconductor chip. The semiconductor chip may be embedded in a material (resin, etc.).

The anode and cathode contacts 44 are on an insulated 33' layer 33. The contacts are extended by "via holes" into the support as far as to layer zones 44, one of which connected by a wire to the cathode.

The invention claimed is:
1. An automotive luminous signaling glazing, comprising:
a laminated glazing including:
a first glazing, forming an exterior glazing, with first and second main faces;
a second glazing, forming an interior glazing, with third and fourth main faces;
disposed between the second main face and the third main face, which are internal faces of the laminated glazing, a lamination interlayer made of a thermoplastic polymeric material, said lamination interlayer having a fifth main face oriented toward the second main face and a sixth main face oriented toward the third main face;
at least one inorganic light-emitting diode, each inorganic light-emitting diode of the at least one inorganic light-emitting diode being of submillimeter-sized thickness,
each inorganic light-emitting diode of the at least one inorganic light-emitting diode being able to emit signaling light in the direction of the second main face, the lamination interlayer comprising a cutout that forms an aperture;
a set of electrically conductive wires anchored on an anchoring face of the lamination interlayer, which is either the fifth main face or the sixth main face,
and wherein,
for each inorganic light-emitting diode, the lamination interlayer comprises, on the face opposite the anchoring face, a blind aperture housing the inorganic light-emitting diode, and/or, for a group of inorganic light-emitting diodes, the lamination interlayer comprises, on the face opposite the anchoring face, a blind and common aperture housing said group of inorganic light-emitting diodes,
wherein said automotive luminous signaling glazing forms a rear windshield or a door glass, and wherein the anchoring face is in contact with the second main face or the third main face.

2. An automotive luminous signaling glazing forming a vehicle front windshield comprising:
a laminated glazing including:
a first glazing made of mineral glass, forming an exterior glazing, with first and second main faces;
a second glazing made of mineral glass, forming an interior glazing, with third and fourth main faces;
disposed between the second main face and the third main face, which are internal faces of the laminated glazing:

a lamination interlayer made of a thermoplastic polymeric material, said lamination interlayer having a fifth main face oriented toward the second main face and a sixth main face oriented toward the third main face;
at least one inorganic light-emitting diode, each inorganic light-emitting diode being of submillimeter-sized thickness, each inorganic light-emitting diode of the at least one inorganic light-emitting diode being able to emit signaling light in the direction of the third main face, and each inorganic light-emitting diode of the at least one inorganic light-emitting diode having an edge face, the lamination interlayer comprising a cutout that forms an aperture;
a set of electrically conductive wires anchored on an anchoring face of the lamination interlayer, which is either the fifth main face or the sixth main face,
wherein,
for each inorganic light-emitting diode, the lamination interlayer comprises, on the face opposite the anchoring face, the aperture that is blind, housing the at least one inorganic light-emitting diode,
and/or, for a group of inorganic light-emitting diodes of the at least one inorganic light-emitting diode, the lamination interlayer comprises, on the face opposite the anchoring face, the aperture that is blind and common, housing said group of inorganic light-emitting diodes,
and wherein the anchoring face is in contact with the second main face or the third main face.

3. The automotive luminous signaling glazing as claimed in claim 1, wherein walls of the blind aperture of the lamination interlayer are spaced apart by at most 0.5 mm from the edge face of the least one inorganic light-emitting diode and/or the walls of a common blind aperture of the lamination interlayer are spaced apart by at most 0.5 mm from each inorganic light-emitting diode of the at least one inorganic light-emitting diode.

4. The automotive luminous signaling glazing as claimed in claim 1, wherein the lamination interlayer is made of acoustic and/or wedge-shaped polyvinyl butyral, or a composite PVB/plastic functional film or PVB/plastic functional film/PVB element, the plastic functional film, bearing an electrically conductive functional layer.

5. The automotive luminous signaling glazing as claimed in claim 1, wherein for each inorganic light-emitting diode of the at least one inorganic light-emitting diode, the lamination interlayer comprises on the face opposite the anchoring face, said aperture that is blind, housing the inorganic light-emitting diode, and the blind aperture is of width of at most 20 mm.

6. The automotive luminous signaling glazing as claimed in claim 1, wherein the lamination interlayer is made of PVB with a thickness ranging from 0.5 to 0.9 mm, the one or more inorganic light-emitting diodes are surface mount devices mounted on a diode carrier.

7. The automotive luminous signaling glazing as claimed in claim 1, wherein the one or more inorganic light-emitting diodes are surface mount devices mounted on a diode carrier, a back face of which is adhesively bonded or held against the second main face for the front windshield or against the third main face for a rear windshield or side window, the adhesive bonding being with an adhesive of thickness (e3)≤0.1 mm.

8. The automotive luminous signaling glazing as claimed in claim 1, wherein the one or more inorganic light-emitting diodes are surface mount devices mounted on a diode carrier, wherein an additional lamination interlayer is between a back face of the diode carrier and the second main face of the front windshield or wherein wherein an additional lamination interlayer is between the back face of the diode carrier and the third main face of a rear windshield or door glass.

9. The automotive luminous signaling glazing as claimed in claim 1, wherein the one or more inorganic light-emitting diodes are surface mount devices mounted on a diode carrier, the diode carrier includes a film made of plastic provided with conductive tracks.

10. The automotive luminous signaling glazing as claimed in claim 1, wherein the one or more inorganic light-emitting diodes are surface mount devices mounted on a face of a flexible diode carrier, the flexible diode carrier is placed in a region of the front windshield, region in which the exterior glazing is rendered opaque by an opaque layer, and/or in which the interior glazing is rendered opaque by an opaque layer, and then including at least apertures in line with the inorganic light-emitting diodes or wherein the flexible diode carrier is placed in a region of the rear windshield or of the door glass, region in which the interior glazing is rendered opaque by an opaque layer, and/or in which the exterior glazing is rendered opaque by an opaque layer, and then including apertures at least in line with the inorganic light-emitting diodes.

11. The automotive luminous signaling glazing as claimed in claim 1, wherein the one or more inorganic light-emitting diodes are surface mount devices mounted on a front face of a flexible diode carrier, the flexible diode carrier extends at least as far as to the edge face of the first glazing, and between a back face of the flexible diode carrier and the second main face of the front windshield or the third main face of the rear windshield or of the door glass, is housed an adhesive that is tight to liquid water and of thickness of at most 0.1 mm.

12. The automotive luminous signaling glazing as claimed in claim 1, wherein at least one of the at least one inorganic light-emitting diode is a luminous indicator of a capacitive touch-control.

13. A vehicle including at least one luminous signaling glazing as claimed in claim 1, wherein, the luminous signaling glazing forms a front windshield, and the signaling light is an anti-collision system, or
wherein the luminous signaling glazing forms a rear windshield and includes a stop light, a third stop light, or
wherein the luminous signaling glazing forming forms a side window and includes a hazard warning light or a light for locating the vehicle or a side repeater.

14. The automotive luminous signaling glazing as claimed in claim 2, wherein the at least inorganic light-emitting diode makes contact with the bottom of the blind aperture or is spaced apart from the bottom by at most 0.2 mm.

15. A process for manufacturing an automotive luminous signaling glazing forming a vehicle front windshield including
a laminated glazing including:
a first glazing made of mineral glass, forming an exterior glazing, with first and second main faces;
a second glazing made of mineral glass, forming an interior glazing, with third and fourth main faces;
disposed between the second main face and the third main face, which are internal faces of the laminated glazing:
a lamination interlayer made of a thermoplastic polymeric material, said lamination interlayer having a fifth main face oriented toward the second main face and a sixth main face oriented toward the third main face;

at least one inorganic light-emitting diode, each inorganic light-emitting diode being of submillimeter-sized thickness, each inorganic light-emitting diode of the at least one inorganic light-emitting diode being able to emit signaling light in the direction of the third main face, and each inorganic light-emitting diode of the at least one inorganic light-emitting diode having an edge face, the lamination interlayer comprising an aperture;

a set of electrically conductive wires anchored on an anchoring face of the lamination interlayer, which is either the fifth main face or the sixth main face, wherein, for each inorganic light-emitting diode, the lamination interlayer comprises, on the face opposite the anchoring face, the aperture that is blind, housing the at least one inorganic light-emitting diode, and/or, for a group of inorganic light-emitting diodes of the at least one inorganic light-emitting diode, the lamination interlayer comprises, on the face opposite the anchoring face, the aperture that is blind and common, housing said group of inorganic light-emitting diodes, the method comprising:

cutting the lamination interlayer carrying said wires in the form of a first thermoplastic sheet of thickness of at most 0.9 mm in order to form the one or more local blind apertures;

assembling the laminated glazing.

16. The process for manufacturing the luminous signaling glazing as claimed in claim 15, wherein the one or more inorganic light-emitting diodes are surface mount devices mounted on a diode carrier.

17. The process for manufacturing the luminous signaling glazing as claimed in claim 15, wherein the first thermoplastic sheet is made of PVB and the electrically conductive wires make contact with another PVB sheet or make contact with the third main face for the front windshield or the second main for the rear windshield or the side window.

18. The process for manufacturing the luminous signaling glazing as claimed in claim 15, wherein the first thermoplastic sheet is made of optionally acoustic and/or wedge-shaped PVB or is a preassembled multileaf consisting of a PVB/plastic film or a PVB/plastic film-/PVB, the wires optionally being on a free surface of the preassembled multileaf.

19. The process for manufacturing the luminous signaling glazing as claimed in claim 18, wherein the first thermoplastic sheet is a preassembled multileaf consisting of a PVB/plastic film including an electrically conductive layer/PVB, and the one or more blind apertures are produced in the PVB without reaching the electrically conductive layer, the wires being on a free surface of the preassembled multileaf.

20. The process for manufacturing the luminous signaling glazing as claimed in claim 15, wherein for the front windshield, the fifth main face is the face opposite the anchoring face and/or the anchoring face is the sixth main face, or wherein for the door glass or the rear windshield the fifth main face is the anchoring face and/or the sixth main face is the face opposite the anchoring face.

21. The process for manufacturing the luminous signaling glazing as claimed in claim 15, wherein the at least one inorganic light-emitting diode is a surface mount device mounted on a diode carrier of thickness (e'2) of at most 0.2 mm, said inorganic light-emitting diodes being mounted on a front face of the diode carrier, which is against the face opposite the anchoring face.

* * * * *